United States Patent
Baniani et al.

(10) Patent No.: US 11,140,020 B1
(45) Date of Patent: Oct. 5, 2021

(54) AVAILABILITY-ENHANCING GATEWAYS FOR NETWORK TRAFFIC IN VIRTUALIZED COMPUTING ENVIRONMENTS

(71) Applicant: Amazon Technologies, Inc., Seattle, WA (US)

(72) Inventors: Behdad Baniani, Vienna, VA (US); Bashuman Deb, Aldie, VA (US); Colm Gearóid MacCárthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 15/909,882

(22) Filed: Mar. 1, 2018

(51) Int. Cl.
| H04L 12/24 | (2006.01) |
| H04L 12/66 | (2006.01) |
| H04L 12/751 | (2013.01) |
| H04L 12/741 | (2013.01) |
| H04L 12/46 | (2006.01) |

(52) U.S. Cl.
CPC .......... H04L 41/06 (2013.01); H04L 12/4641 (2013.01); H04L 12/66 (2013.01); H04L 45/02 (2013.01); H04L 45/745 (2013.01)

(58) Field of Classification Search
CPC ..... H04L 41/06; H04L 12/4641; H04L 12/66; H04L 45/02; H04L 45/745
See application file for complete search history.

(56) References Cited

U.S. PATENT DOCUMENTS

| 6,330,599 | B1 | 12/2001 | Harvey |
| 6,810,427 | B1 | 10/2004 | Cain et al. |
| 6,831,917 | B1 | 12/2004 | Cheriton |
| 6,993,021 | B1 | 1/2006 | Chuah et al. |
| 7,228,564 | B2 | 6/2007 | Raikar et al. |
| 7,325,239 | B2 | 1/2008 | Hariharan et al. |
| 7,782,782 | B1 | 8/2010 | Ferguson et al. |
| 7,865,586 | B2 | 1/2011 | Cohn |
| 8,005,098 | B2 | 8/2011 | Barach et al. |
| 8,082,581 | B2 | 12/2011 | Wu |
| 8,161,550 | B2 | 4/2012 | Keen et al. |
| 8,199,651 | B1 | 6/2012 | Schrempp et al. |

(Continued)

FOREIGN PATENT DOCUMENTS

WO 2008110955 9/2008

OTHER PUBLICATIONS

AWS, "Amazon Elastic Compute Cloud: User Guide for Linux Instances", Updated API Version Nov. 15, 2015, pp. 1-883.

(Continued)

*Primary Examiner* — Jeffrey M Rutkowski
*Assistant Examiner* — Jasper Kwoh
(74) *Attorney, Agent, or Firm* — Robert C. Kowert; Kowert, Hood, Munyon, Rankin & Goetzel, P.C.

(57) ABSTRACT

At a computing service, an indication of associations of a set of network interfaces with a gateway is obtained. Individual ones of the interfaces are configured in respective availability-based resource groups. In response to detecting that a message originates at a resource within a particular availability-based resource group, a network interface of the set is selected based at least partly on the source of availability-based resource group, and the message is transmitted to a network address assigned to the selected interface.

20 Claims, 10 Drawing Sheets

(56) References Cited

U.S. PATENT DOCUMENTS

| | | | |
|---|---|---|---|
| 8,209,749 B2 | 6/2012 | Babula et al. | |
| 8,244,909 B1 | 8/2012 | Hanson et al. | |
| 8,261,341 B2 | 9/2012 | Stirbu | |
| 8,296,847 B2 | 10/2012 | Mendonca et al. | |
| 8,331,371 B2 | 12/2012 | Judge et al. | |
| 8,358,658 B2 | 1/2013 | Flynn et al. | |
| 8,443,435 B1 | 5/2013 | Schroeder | |
| 8,478,896 B2 | 7/2013 | Ehlers | |
| 8,512,980 B2 | 8/2013 | Novokhatny | |
| 8,543,734 B2 | 9/2013 | McDysan | |
| 8,549,518 B1 | 10/2013 | Aron et al. | |
| 8,559,441 B2 | 10/2013 | Miyabe | |
| 8,559,449 B2 | 10/2013 | Rao et al. | |
| 8,612,599 B2 | 12/2013 | Tung et al. | |
| 8,640,239 B2 | 1/2014 | Lukas et al. | |
| 8,656,420 B2 | 2/2014 | Foster et al. | |
| 8,656,492 B2 | 2/2014 | Boot et al. | |
| 8,693,470 B1 | 4/2014 | Maxwell et al. | |
| 8,705,394 B2 | 4/2014 | Venkatachalapathy et al. | |
| 8,752,173 B2 | 6/2014 | Yadav | |
| 8,868,710 B2 | 10/2014 | Schultze et al. | |
| 8,873,556 B1 | 10/2014 | Zuk et al. | |
| 9,065,677 B2 * | 6/2015 | Schrum, Jr. | H04L 45/54 |
| 9,306,870 B1 * | 4/2016 | Klein | H04L 29/06176 |
| 9,652,265 B1 | 5/2017 | Narayanasamy et al. | |
| 9,722,932 B1 | 8/2017 | Brandwine | |
| 9,813,379 B1 | 11/2017 | Shevade et al. | |
| 9,882,968 B1 | 1/2018 | Holgers et al. | |
| 9,934,273 B1 | 4/2018 | MacCarthaigh | |
| 9,935,829 B1 | 4/2018 | Miller et al. | |
| 9,954,763 B1 * | 4/2018 | Ye | H04L 45/04 |
| 9,998,955 B1 | 6/2018 | MacCarthaigh | |
| 10,033,602 B1 | 7/2018 | Russell | |
| 10,044,581 B1 | 8/2018 | Russell | |
| 10,097,454 B1 | 10/2018 | MacCarthaigh | |
| 10,217,145 B1 | 2/2019 | Ye et al. | |
| 10,244,044 B2 | 3/2019 | Holgers et al. | |
| 10,313,225 B1 | 6/2019 | Shevade et al. | |
| 10,326,710 B1 | 6/2019 | Hashmi et al. | |
| 2003/0182322 A1 | 9/2003 | Manley et al. | |
| 2005/0271067 A1 | 12/2005 | King et al. | |
| 2006/0031461 A1 | 2/2006 | Mathur et al. | |
| 2007/0153707 A1 * | 7/2007 | Thubert | H04L 45/025 370/254 |
| 2008/0025218 A1 | 1/2008 | Liu | |
| 2008/0181134 A1 | 7/2008 | Anerousis et al. | |
| 2008/0228932 A1 | 9/2008 | Monette et al. | |
| 2009/0327821 A1 | 12/2009 | Bauerle et al. | |
| 2011/0022694 A1 | 1/2011 | Dalal et al. | |
| 2011/0142053 A1 | 6/2011 | Van Der Merwe et al. | |
| 2011/0145836 A1 | 6/2011 | Wheeler et al. | |
| 2011/0149964 A1 | 6/2011 | Judge et al. | |
| 2011/0255538 A1 | 10/2011 | Srinivasan et al. | |
| 2011/0289118 A1 | 11/2011 | Chen et al. | |
| 2012/0331032 A1 * | 12/2012 | Balachandran | H04L 69/164 709/202 |
| 2013/0031424 A1 | 1/2013 | Srivastava et al. | |
| 2013/0041987 A1 | 2/2013 | Warno | |
| 2013/0132545 A1 | 5/2013 | Schultze et al. | |
| 2013/0191881 A1 | 7/2013 | Linden et al. | |
| 2013/0215740 A1 * | 8/2013 | Tse | H04L 41/0806 370/228 |
| 2013/0227355 A1 | 8/2013 | Dake et al. | |
| 2013/0250799 A1 | 9/2013 | Ishii | |
| 2013/0254767 A1 * | 9/2013 | Mizuno | H04L 47/12 718/1 |
| 2013/0301652 A1 | 11/2013 | Oz et al. | |
| 2013/0343387 A1 | 12/2013 | Stroud et al. | |
| 2013/0346585 A1 | 12/2013 | Ueno | |
| 2014/0052836 A1 | 2/2014 | Nguyen et al. | |
| 2014/0075048 A1 | 3/2014 | Yuksel et al. | |
| 2014/0157274 A1 | 6/2014 | Ballani et al. | |
| 2015/0039674 A1 | 2/2015 | Agarwal et al. | |
| 2015/0063360 A1 | 3/2015 | Thakkar et al. | |
| 2015/0063364 A1 | 3/2015 | Thakkar et al. | |
| 2015/0163196 A1 * | 6/2015 | Bhagwat | H04L 61/2061 709/245 |
| 2015/0261558 A1 | 9/2015 | Robinson et al. | |
| 2015/0263899 A1 | 9/2015 | Tubaltsev et al. | |
| 2015/0263946 A1 | 9/2015 | Tubaltsev et al. | |
| 2015/0281081 A1 | 10/2015 | Rajahalme | |
| 2015/0281125 A1 | 10/2015 | Koponen et al. | |
| 2015/0381567 A1 * | 12/2015 | Johnson | G06F 21/105 726/12 |
| 2016/0087940 A1 * | 3/2016 | Miller | G06F 9/45558 |
| 2016/0173600 A1 | 6/2016 | Galles et al. | |
| 2016/0182473 A1 * | 6/2016 | Cignetti | H04L 63/0428 713/171 |
| 2019/0068689 A1 | 2/2019 | Ram et al. | |
| 2019/0222636 A1 | 7/2019 | Holgers et al. | |

OTHER PUBLICATIONS

"A Brief Primer on Anycast", Matthew Prince, Oct. 21, 2011, pp. 1-4.

"Amazon Elastic Compute Cloud", User Guide for Linux, API Version, Jun. 15, 2014, pp. 1-684.

Amazon Web Services, "Shuffle Sharding: massive and magical fault isolation", http://www.awsarchitectureblog.com/2014/04/shuffle-sharding.html, Sep. 17, 2014, pp. 1-6.

Costin Raiciu, et al "Improving Datacenter Performance and Robustness with Multipath TCP" SIGCOMM'11, Aug. 15-19, 2011, pp. 1-12.

Albert Greenberg, et al "VL2: A Scalable and Flexible Data Center Network" Communications of the ACM, vol. 54, No. 3, Mar. 2011, pp. 1-10.

Chuanxiong Guo, et al "BCube: A High Performance, Server-centric Network Architecture for Modular Data Centers" SIGCOMM'09 Aug. 17-21, pp. 1-12.

"On the Impact of Packet Spraying in Data Center Networks", Advait Dixit, et al., 2013, pp. 1-9.

Amazon Web Service, AWS Direct Connect; User Guide API Version, Oct. 22, 2013, pp. 1-42.

Amazon Web Services, Amazon Virtual Private Cloud, User Guide API Version, Oct. 1, 2013, pp. 1-143.

U.S. Appl. No. 14/736,165, filed Jun. 10, 2015, Colm Maccarthaigh. Application Only.

U.S. Appl. No. 13/528,271, filed Jun. 20, 2012, Long X. Nguyen. Application Only.

U.S. Appl. No. 15/716,201, filed Sep. 26, 2017, Melissa Elaine Davis. Application Only.

* cited by examiner

AVAILABILITY-ENHANCING GATEWAYS FOR NETWORK TRAFFIC IN VIRTUALIZED COMPUTING ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines.

Operators of provider networks that implement virtualized computing, storage, and/or other services may sometimes organize their resources into availability-based resource groups, such that each group uses an independent set of physical resources (including computing as well as non-computing resources like power infrastructure elements, cooling infrastructure elements and the like). Customers of such provider networks may set up their applications using resources within multiple resource groups, so that in the unlikely event that a failure occurs in one resource group, its impact does not cause an entire application to become unavailable. In many cases, a given application running at a first set of resources of the provider network may utilize another set of resources or services of the provider network, and both sets of resources may be spread across multiple availability-based resource groups. Orchestrating network traffic between such resource groups in a manner which enhances the overall availability of the applications and services, without placing an undue configuration burden on the customers of the provider network, may present a non-trivial technical challenge.

Figure 1:
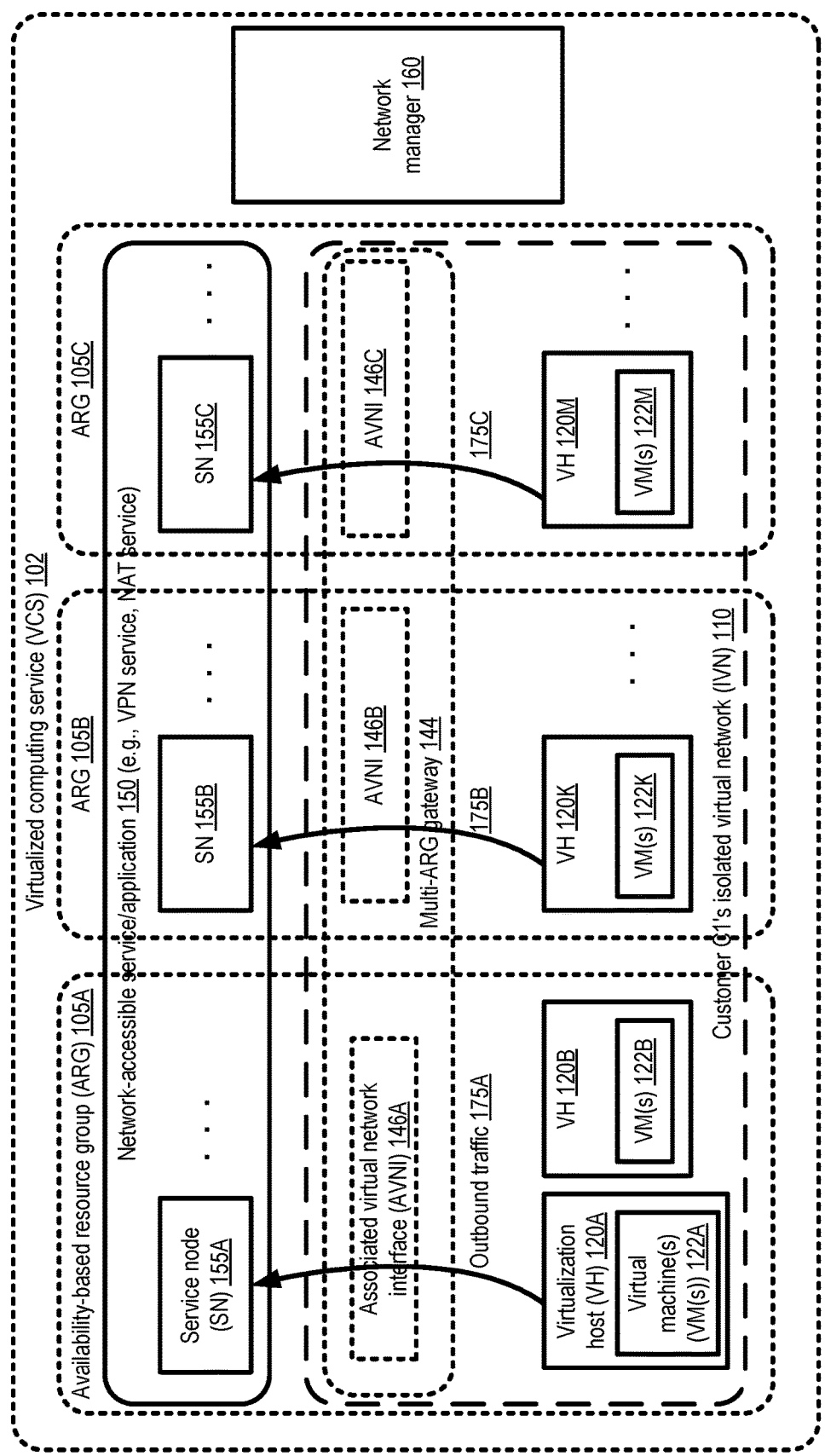
FIG. 1 illustrates an example system environment in which a gateway that can be used to route network traffic at a virtualized computing service based at least partly on availability-based considerations may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for routing network traffic associated with a virtualized computing service based on availability considerations, using gateways that are shared among multiple availability-based resource groups, are described. As one skilled in the art will appreciate in light of this disclosure, certain embodiments may be capable of achieving various advantages, including some or all of the following: (a) improving the overall availability of applications and services being implemented at or accessed from the virtualized computing service by reducing the probability that any given failure results in a disruption, (b) simplifying the networking-related configuration operations performed for at least some applications and services that span multiple availability-based resource groups and/or (c) improving responsiveness of at least some types of service requests being processed using the virtualized computing service by distributing network traffic along multiple pathways.

According to at least some embodiments, a virtualized computing service may be implemented at a provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in such embodiments. A provider network may sometimes be referred to as a "public cloud" environment. The resources of a provider network may in some embodiments be distributed across multiple data centers, which in turn may be distributed among numerous geographical regions (e.g., with each region corresponding to one or more cities, states or countries). In at least one embodiment, the provider network's resources within a given region may be organized as one or more availability-based resource groups (ARGs). Such resource groups may also be termed "availability zones" or "availability containers" in some embodiments. An ARG in turn may comprise resources located in portions or all of one or more distinct locations or data centers in various embodiments, engineered in such a way (e.g., with independent infrastructure components such as power-related equipment, cooling equipment, and/or physical security components) that the resources of a given ARG are insulated from failures in other ARGs. As such, a failure in one ARG may not be expected to result in a failure in any other ARG; thus, individual ARGs may have respective failure containment boundaries, and the availability profile of a given resource may be intended to be independent of the availability profile of resources in a different ARG. In at least one embodiment, the provider network (or the virtualized computing service) may be organized simply as a collection of availability-based resource groups, without using geographical regions as an intermediate hierarchy layer. In some embodiment, the resources of a given ARG may be spread across multiple physical locations—e.g., at more than one data center.

In various embodiments, customers of the virtualized computing service (VCS) may acquire and utilize virtualized resources, such as instances of a number of virtual machine categories defined by the VCS, for their computing needs by submitting programmatic requests to the VCS. Note that in at least some embodiments in which the VCS is implemented at a provider network, customers or clients of the VCS may include other services that are also implemented within the same provider network, and in some cases implemented using the VCS itself. Of course, some customers/ clients of the VCS may be entities or organizations outside the provider network in various embodiments. The VCS may implement a number of programmatic interfaces for client interactions in some embodiments, such as a web-based console, application programming interfaces (APIs), command-line tools, graphical user interfaces and the like. In some embodiments, at least some physical resources of the VCS, such as hosts at which multiple virtual machines may be instantiated, may be managed in a multi-tenant manner—for example, a given host may be used for respective virtual machines of more than one customer at a time. In various embodiments, virtual network interfaces (VNIs) (which may also be referred to as "elastic network interfaces") may be configured by clients using the VCS's programmatic interfaces, enabling some networking-related attributes such as IP (Internet Protocol) addresses to be transferred relatively easily between virtual machines without necessarily reconfiguring physical network cards. Such attribute transfers may be accomplished, for example, by detaching a virtual network interface programmatically from one virtual machine and attaching it programmatically to another virtual machine.

In some embodiments, for example to provide enhanced isolation and security to VCS customers or clients, at least a subset of resources of a VCS may be configured as a plurality of isolated virtual networks (IVNs). An IVN may comprise a collection of computing and/or other resources in a logically isolated section of the provider network, and may be established at the request of a particular customer or client of the VCS of the provider network. The customer may be granted substantial control with respect to networking configuration for the devices included in an IVN set up on the customer's behalf in some embodiments. In some embodiments, for example, a customer may select the IP (Internet Protocol) address ranges to be used for virtual network interfaces (VNIs) to be attached to various ones of the customer's virtual machines in the IVN, manage the creation of subnets within the IVN, and/or the configuration of at least some types of routing metadata (e.g., including one or more route tables associated with respective subnets) for the IVN. In some embodiments, resources that are to be used to perform the operations of one or more other services (e.g., services that help provide secure connectivity to resources at client-owned or client-managed data centers outside the provider network, file storage services, or database services) implemented at the provider network may also be organized in one or more IVNs.

A given IVN set up on behalf of a VCS client may include virtual machines in several different ARGs in some embodiments. One or more applications or services (such as a virtual private network (VPN) service) being used or accessed by programs running on the client's virtual machines may also be implemented using resources spread across more than one ARG (e.g., in one or more IVNs set up for the service or application) in various embodiments. In some such embodiments, the routing of network messages or packets from a given customer's virtual machines to a set of networking endpoints or destinations of the service or application may be handled at least in part using a gateway which takes the source ARG of the messages into account as described below. Such an approach may help ensure that a failure in any single ARG does not impact client-generated traffic originating in other ARGs in various embodiments. Such gateways may be referred to in at least some embodiments as multi-ARG gateways.

According to at least some embodiments, a system may comprise a plurality of resources of a VCS organized into availability-based resource groups (ARGs), and one or more networking administration components responsible for various aspects of connectivity configuration. The networking administration components, which may be implemented using one or more computing devices, and may in some cases include agents at respective virtualization hosts of the VCS, may be referred to collectively in some embodiments as a network manager (or networking manager) of the VCS. In various embodiments, the network manager may determine a set of destination network addresses of an application for which resource-group based message processing is to be performed using a particular multi-ARG gateway. Multi-ARG gateways or MAGs may also be referred to as multi-resource-group gateways in various embodiments. A given multi-resource-group gateway may, for example, comprise metadata stored in one or more data structures instantiated by the network manager in various embodiments in response to one or more programmatic requests from a VCS client. At least a portion of the metadata of a MAG may be propagated or distributed to a variety of entities of the VCS, e.g., to network manager agents running at numerous virtualization hosts, to one or more other networking intermediary devices such as routers, and so on. In some embodiments, metadata representing an MAG may be stored with, or as part of, the metadata pertaining to an IVN whose outbound traffic is to be managed using the MAG; that is, in such embodiments, an MAG may in effect be considered part of an IVN. In at least one embodiment, an entry may be added to a route table (e.g., a route table of an IVN whose traffic is to be processed using the MAG) to indicate the association between a given MAG and the set of destination network addresses. In some embodiments, a MAG may in effect be considered a collection of metadata and message processing rules, with the rules being implemented at some collection of hardware and/or software, without necessarily being tied to a specific hardware device or software process. The particular hardware devices at which the logic of a given MAG is implemented may vary over time in at least some embodiments, e.g., in response to detected failures and/or changes in workload. In at least one embodiment, an MAG may be used regardless of whether or not the sources of the traffic being routed using the MAG are part of an isolated virtual network or not; that is, the existence of an IVN is not a prerequisite for an MAG.

The network manager may store, e.g., as part of the gateway's data structures, indications of the associations of one or more virtual network interfaces (VNIs) with the multi-ARG gateway in some embodiments. Individual ones of the virtual network interfaces may be configured within respective ARGs—e.g., if there are three ARGs being used for the client's virtual machines and for a service being accessed from the client's virtual machines, a total of at least three VNIs may be associated with the gateway in some embodiments. When a network message is directed from one of the client's virtual machines to one of the destination network addresses, the source ARG of the message (i.e., the ARG which contains the resource at which the message originated) may be determined and used to select one of the associated VNIs of the gateway in various embodiments, and the message may be transmitted to an address associated with that selected VNI. The message may then be received and processed at a computing platform corresponding to the selected VNI (such as virtual machine to which the selected VNI has been attached by the network manager). For example, if the gateway set up for the application has three associated VNIs VNI-a, VNI-b, and VNI-c configured within ARG-a, ARG-b and ARG-c respectively, and a message is directed to a destination network address from a virtual machine within ARG-b, in one embodiment VNI-b may (at least under normal operating conditions) be selected as the interface to whose network address the message should be sent for further processing/forwarding along a path to its ultimate destination. At the computing platform to which the VNI is attached, application-specific or service-specific processing may be performed when the message is received in various embodiments—e.g., the message may be encrypted and/or compressed prior to further transmission, an application-specific protocol may be used to transform the message in some way, or the message may simply be forwarded on towards the destination address.

In one embodiment, one or more private and/or public network addresses (e.g., IP version 4 or IP version 6 addresses) may be assigned to an MAG itself (as distinct from IP addresses assigned to virtual network interfaces that are associated with the MAG in each of the different ARGs). A private IP address may be one that is not accessible from outside the isolated virtual network for which the MAG is configured, while the public IP address may be accessible from outside the isolated virtual network. In some embodiments in which such a network address MAGIPAddr is designated for a MAG, messages that are to be routed via the MAG's associated VNIs may be transmitted directly to the MAGIPAddr, and a route table entry indicating the mapping between a set of destination addresses and the MAG may not be required. In at least some embodiments, an additional virtual network interface (other than the ones created for respective ARGs whose traffic is being routed with the help of the MAG) may be set up to help support direct addressability for the MAG, and MAGIPAddr may be assigned to the additional virtual network interface. Such an additional virtual network interface may in effect be considered a logical proxy for the per-ARG virtual network interfaces associated with the MAG in various embodiments.

At a high level, in various embodiments, a multi-ARG gateway may provide a mapping between source ARGs of network messages/packets of an application or service, and respective VNIs that have been set up as intermediary recipient interfaces for the messages along paths to a set of destination addresses of the application or service. In at least some embodiments, as mentioned earlier, at least one such VNI may have been established within each ARG of interest, so that as long as at least one ARG remains operational and accessible, messages related to the application may be transmitted or routed to the service or application successfully. Because VNIs may be attached and detached programmatically from virtual machines, the failure of a given virtual machine (which was being used for application-specific processing or forwarding while a VNI of the gateway was attached to it) may be handled by attaching the VNI to a different virtual machine in various embodiments. The association of transferable VNIs with the multi-ARG gateway may simplify networking configuration for multi-ARG applications and services considerably in various embodiments, as the administrators of the service may not have to be concerned with reconfiguring specific hardware components in the unlikely event of a failure. Furthermore, in various embodiments, if an application or service was being run in K resource groups with the help of a particular multi-ARG gateway GW1, and a decision is made to run it in (K+n) resource groups, n additional VNIs may easily be associated with GW1 to enable continued use of GW1 in the new configuration. It is noted that multi-resource-group gateways of the kinds discussed herein may be employed for a variety of networking protocols in different embodiments, including for example protocols of the TCP/IP (Transmission Control Protocol/Internet Protocol) family, and are not restricted to any particular protocol.

A multi-ARG gateway (MAG) of the kind described above may be used to direct traffic towards a variety of destination address classes of an application or service in various embodiments. In one embodiment, for example, at least one network address of the set of destination network addresses associated with an MAG may be assigned to a device within a data center of a client of the computing service, and contents of the messages to such destinations may be transmitted to the data center via a pathway that includes a virtual private network (VPN) connection using any of various VPN protocols. In another embodiment, the source of a network message handled using the gateway may be configured within one isolated virtual network (IVN), while the destination may be configured within a different IVN. In some embodiments, an MAG may be used to process requests directed from a private network address within a client's IVN (a network address that is not visible outside a client's IVN) to the public portion of the Internet; that is, the destination address may be accessible from the public Internet. In one embodiment, an MAG may be used to direct traffic between the VCS and a different network-accessible service implemented at a provider network, such as a database management service, a storage service, a machine learning service or the like.

A number of application programming interfaces (APIs) and/or other programmatic interfaces may be implemented by a network manager to enable clients to configure MAGs. For example, as indicated earlier, in some embodiments a client may submit a programmatic request via such an interface to generate a new MAG. Parameters of such a request may include, among others, the identifier of an isolated virtual network from which outbound messages are to be routed using the MAG, the set of ARGs for which respective VNIs are to be associated with the MAG, and so on in various embodiments. In some embodiments, programmatic requests may be used to associate one or more VNIs with a specified MAG. In one embodiment, an administrative subnet may be set up by a network manager within a client's IVN, and addresses from within such an administrative subnet may be used for the VNIs to be associated with the MAG. In at least one embodiment, a particular IP address (e.g., selected from within an address space being used at a client's IVN) may be designated via programmatic request for the MAG, making the MAG directly addressable from virtual machines and/or other resources within one or more of the ARGs.

Example System Environment

FIG. 1 illustrates an example system environment in which a gateway that can be used to route network traffic at a virtualized computing service based at least partly on availability-based considerations may be implemented, according to at least some embodiments. As shown, system 100 comprises various components of a virtualized computing service (VCS) 102 of a provider network, including a network manager 160, virtual machines 122 (e.g., VMs 122A, 122B, 122K and 122M) set up at virtualization hosts 120 (e.g., VHs 120A, 120B, 120K and 120M) in a customer C1's isolated virtual network (IVN) 110, and service nodes 155 (e.g., SN 155A, 155B and 155C) of another network-accessible service accessible to the customer's virtual machines 122. Individual ones of the virtualization hosts 120 may comprise a set of virtualization management components (implemented using some combination of hardware and software) that can support the configuration and management of one or more virtual machines 122 locally in the depicted embodiment.

The network manager 160 may be implemented using software and hardware distributed across a number of computing devices in various embodiments, including a set of administrative components set up at hosts that are not used for customer-accessible virtual machines, as well as components running at virtualization hosts and networking intermediary devices such as routers and the like. As indicated earlier, a given isolated virtual network, such as IVN 120, may comprise a collection of computing and/or other resources in a logically isolated section of a provider network in some embodiments. A customer may be granted substantial control with respect to networking configuration for the devices included in an IVN set up on the customer's behalf in various embodiments—e.g., a range of private IP addresses that are not visible outside the IVN may be selected by the customer for their virtual machines 122, one or more public IP addresses that are visible outside the IVN may be selected, security settings for inbound and outbound traffic may be configured by the customer, and so on. In some embodiments, the service nodes 155, individual ones of which may be implemented using one or more computing devices, may be configured as part of a different isolated virtual network than client C1's IVN 120.

In the depicted embodiment, at least a subset of resources of the VCS 102 may be distributed among a plurality of availability-based resource groups (ARGs) 105, such as ARG 105A, 105B and 105C. As mentioned earlier, an ARG 105 may comprise resources located in portions or all of one or more distinct locations or data centers in various embodiments, engineered in such a way (e.g., with independent infrastructure components such as power-related equipment, cooling equipment, and/or physical security components) that the resources of a given ARG are insulated from failures in other ARGs. As such, individual ARGs may have respective logical and/or physical fault isolation boundaries selected by the VCS administrators.

A given ARG 105 may comprise resources used for virtual machines 122 established for clients of the VCS, as well as resources that are allocated to applications or services utilized from those client virtual machines, such as service nodes 155. Thus, for example, within ARG 105A, client VMs 122A and 122B as well as service node 155A may be instantiated in the depicted example scenario. Similarly, client VM(s) 122K and service node 155B may be set up within ARG 105B, while client VM(s) 122M and service node 155C may be set up within ARG 105C.

A multi-ARG gateway (MAG) 144 may be established by the network manager 160 in the depicted embodiment to help improve the availability of application/service 150, e.g., with respect to service requests generated within IVN 110. In various embodiments, a given MAG may comprise one or more data structures storing configuration mappings that can be used to direct outbound traffic 175 (e.g., 175A, 175B or 175C) associated with a particular service or application (e.g., service 150) from a given customer's IVN to a given set of network destination addresses outside the IVN (e.g., a set of network addresses associated with SNs 155). Thus, for example, if service/application 150 has 100 different customers with respective IVNs, in at least some embodiments, 100 different MAGs may be established by the network manager. In other embodiments, there may not necessarily be a 1:1 relationship between customer IVNs and MAGs being used for a given application.

In some embodiments, the establishment of an MAG 144 may be initiated as a result of a submission of a programmatic request to the network manager 160 by a customer or client of the VCS. Data structures storing various attributes of the MAG may be created and populated by the network manager 160 in the depicted embodiment. The attributes may, for example, include a name or identifier of the MAG, the associated IVN(s) and client identifiers, the set or range of destination network addresses for which availability-based routing is to be performed with the help of the MAG, and so on. In various embodiments, one or more virtual network interfaces may be associated with the MAG 144, e.g., in response to the submission of additional programmatic requests by clients, or based on parameters provided in the initial programmatic request to create the MAG. As shown, MAG 144 has at least three associated VNIs (AVNIs) 146, including AVNI 146A established in ARG 105A, AVNI 146B established in ARG 105B, and AVNI 146C established in ARG 146C.

After MAG 144 has been instantiated and its attributes, including for example the set of destination network addresses, the set of associated VNIs, and the like have been determined by the network manager 160, subsequent outbound network messages from within the IVN 110 (e.g., TCP/IP packets, UDP packets and the like) to the service nodes 155 may be handled using the MAG. In at least some embodiments, at least a portion of the attributes of the MAG 144 may be distributed to network manager components running at various virtualization hosts 120 (e.g., as part of virtualization management hardware/software stacks responsible for networking) and/or to other networking related devices such as routers of the VCS 102. In at least one embodiment, a route table entry indicating the MAG 144 as an intermediate hop destination along a path to the destination network addresses of the service nodes 155 may be stored by the network manager; as such, the route table entry may indicate the association of the set of destination network addresses with the gateway.

When a network message is directed towards a service node, a network manager component may determine (a) that the destination network address of the message is one of the set of destination network addresses associated with the MAG 144 and (b) the source ARG of the message (i.e., the particular ARG in which the VM 122 that is sending the message is instantiated) in the depicted embodiment. Based at least in part on the source ARG 105, a corresponding AVNI may be selected from among the AVNIs 146 of the MAG 144, and the message may be transmitted to a network address associated with the selected AVNI in at least some embodiments. For example, in various embodiments, if an AVNI within the source ARG is operational and reachable, that AVNI may be selected as an intermediary along the path to the ultimate destination (a service node 155) of the message. Thus, AVNI 146A may be selected for packets originating in ARG 105A, AVNI 146B may be selected for packets originating in ARG 105B, AVNI 146C may be selected for packets originating in ARG 105C, and so on. In some embodiments, if no AVNI can be reached or accessed in the source ARG, a different AVNI (if one is reachable/accessible) may be selected for the message. In at least one embodiment, among the AVNIs of an MAG, one may be designated as a default, to be used if the preferred source-ARG-AVNI is not accessible or is not configured. In other embodiments, a preferred AVNI chain may be set up, indicating a primary default AVNI to be used if one in the source ARG of the message cannot be used, a secondary AVNI to be used if the primary AVNI is unreachable, and so on. In one embodiment, at least under some operating conditions, an AVNI that may not necessarily be part of the source ARG may be selected even if an AVNI is reachable within the source ARG.

When the network message reaches the execution platform (e.g., a virtual machine) to which the selected AVNI is attached, it may be processed in an application-specific way in the depicted embodiment—e.g., based on the needs of the application/service 150. In some cases, contents of the message may for example be encrypted, compressed, or otherwise transformed, while in other cases the message may simply be forwarded on. Note that at least in some embodiments, a program which generates an outbound network message at a virtual machine 122 in IVN 110 may not have individual network addresses of the service nodes 155 available; instead, the destination addresses of the message may be one that is assigned to a device (e.g., a server within a client's data center external to the VCS) for which the service/application 150 is acting as an intermediary. In at least some embodiments, MAGs may be used primarily for outbound traffic from an IVN such as 110.

By enabling multiple VNIs to be associated with an MAG, the availability of an application or service 150 (e.g., a Virtual Private Network (VPN) service, a Network Address Translation (NAT) service or the like, which may provide access to devices outside the VCS 102) may be substantially enhanced in the depicted embodiment. For example, in the unlikely event that a failure disrupts network access to a given ARG 105, traffic from VMs within other ARGs of the IVN 110 may continue without interruption. Furthermore, if the service 150 expands to a new ARG, an additional VNI may be configured easily to handle outbound traffic from the IVN 110 to that new ARG in various embodiments. Because VNIs may be attached/detached programmatically from execution platforms such as virtual machines, hardware configurations may not need to change as VNIs are associated with or disassociated from the MAG in various embodiments. Using multiple AVNIs may also help distribute the network traffic processing workload of service/application 150 among multiple pathways, thereby potentially improving responsiveness, throughput and/or other performance metrics.

In various embodiments, one or more MAGs may be used for availability-based routing of outbound traffic for a variety of destination types, services and/or applications. As indicated above, in some embodiments, MAGs may be set up for a VPN service to be used for communications between a customer's IVN and premises outside the provider network at which the VCS is implemented—that is, destination network addresses of an MAG may have been assigned to devices in customer-owned premises external to the provider network. Some external network addresses to which traffic may be routed using an MAG may be accessible from the public Internet in various embodiments. In one embodiment, the destination network addresses may be part of an address range selected by some other customer for a different IVN—that is, an MAG may be used to direct traffic flowing between two different IVNs of the VCS. In some embodiments, the provider network may implement numerous other services in addition to the VCS itself—e.g., a machine learning service, a storage service or a database service may be supported, and the MAG may be used for traffic flowing between pairs of services.

Region-Level Multi-ARG Gateways

Figure 2:
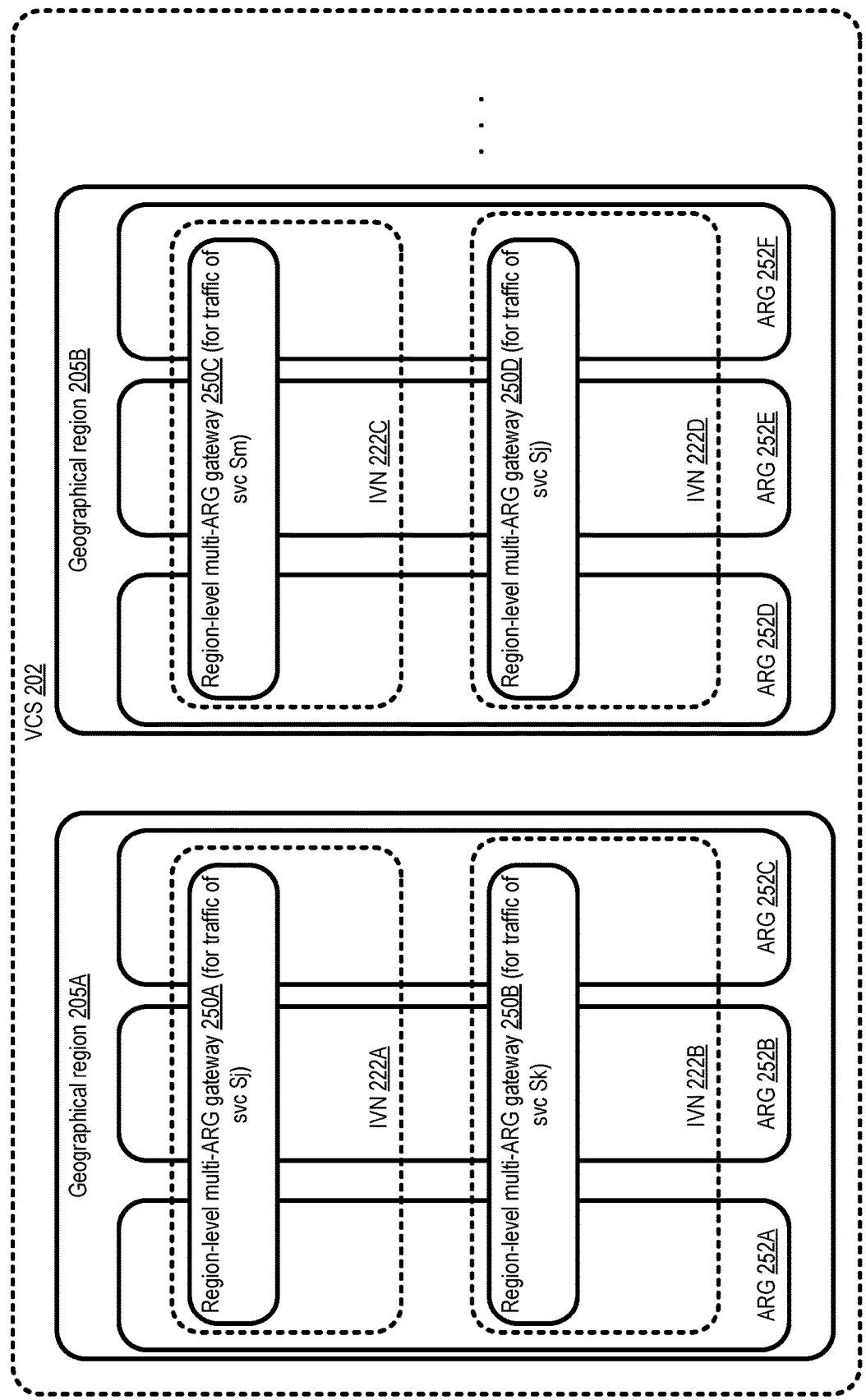
FIG. 2 illustrates an example virtualized computing service in which respective gateways may be established for availability based traffic routing in different geographic regions, according to at least some embodiments.

In some embodiments a provider network's resources may be subdivided into logical or administrative groups based on the geographical regions in which various data centers are located, and customers of the provider network's services may choose the regions in which they wish to acquire and utilize resources of the provider network. FIG. 2 illustrates an example virtualized computing service in which respective gateways may be established for availability based traffic routing in different geographic regions, according to at least some embodiments. As shown, VCS 202's resources are distributed hierarchically, using a hierarchy of at least two levels: the region level and the availability-based resource group (ARG) level, with a given region comprising one or more ARGs.

As shown, geographic region 205A may comprise ARGs 252A, 252B and 252C, while geographic region 205B may comprise ARGs 252D, 252E and 252F. Within a given region 205, one or more isolated virtual networks (IVNs) 222 may be established on behalf of individual customers. Note that the number of ARGs across which the resources of a given IVN 222 are distributed may vary based on the customer's preferences or needs in the depicted embodiment; although each IVN is shown as spanning all three ARGs in a region, some IVNs may not necessarily use all ARGs of a region. Some customers may establish IVNs in several different regions in the depicted embodiment. In at least one embodiment, ARGs may span region boundaries—e.g., a given availability group may include resources at data centers in two or more different regions.

A network manager of VCS 202 may establish respective multi-ARG gateways at the region level in the depicted embodiment, e.g., in response to programmatic requests. A given multi-ARG gateway 250 (e.g., 250A, 250B, 250C or 250D) may be configured for a combination of a particular IVN and a particular service whose service nodes may be spread across multiple ARGs (and/or multiple regions) in some embodiments. For example, gateway 250A may be established for traffic directed to service Sj from IVN 222A, gateway 250B may be set up for traffic directed to service Sk from IVN 222B, gateway 250C may be set up for traffic directed to service Sm from IVN 222C, while gateway 250D may be set up for traffic directed to service Sj from IVN 222D. As illustrated by gateways 250B and 250D, more than one gateway may be set up for traffic directed to a given service (Sj in the depicted example) in at least some embodiments. In various embodiments, if network traffic is expected to flow from a given IVN to multiple services, respective gateways may be established for the different services—e.g., another region-level gateway may be set up in region 205A for traffic from IVN 222B to another service such as Sm or Sp. In other embodiments, a given gateway may be used for traffic directed to multiple sets of destination network addresses associated with respective services—e.g., the same gateway may be used for traffic to more than one service. A set of per-ARG VNIs may be associated with individual ones of the gateways 250 in the depicted embodiment. For example, for gateways 250A and 250B, associated sets of VNIs may be set up respectively for three ARGs 252A, 252B and 252C, while for gateways 250C and 250D, associated sets of VNIs may be set up respectively for three ARGs 252D, 252E and 252F. As needed, additional VNIs may be associated with the multi-ARG gateways in various embodiments programmatically, or VNIs that are currently associated may be disassociated programmatically. In at least some embodiments, a single multi-ARG gateway may be set up for multiple regions, e.g., for all the regions making up a VCS 202, or for a subset comprising more than one region. Generally speaking, a multi-ARG gateway may be established for any combination of one or more ARGs in various embodiments, regardless of the geographical locations (e.g., data centers or regions) of the resources included in the ARG combination.

Methods for Configuring and Using Multi-Resource-Group Gateways

Figure 3:
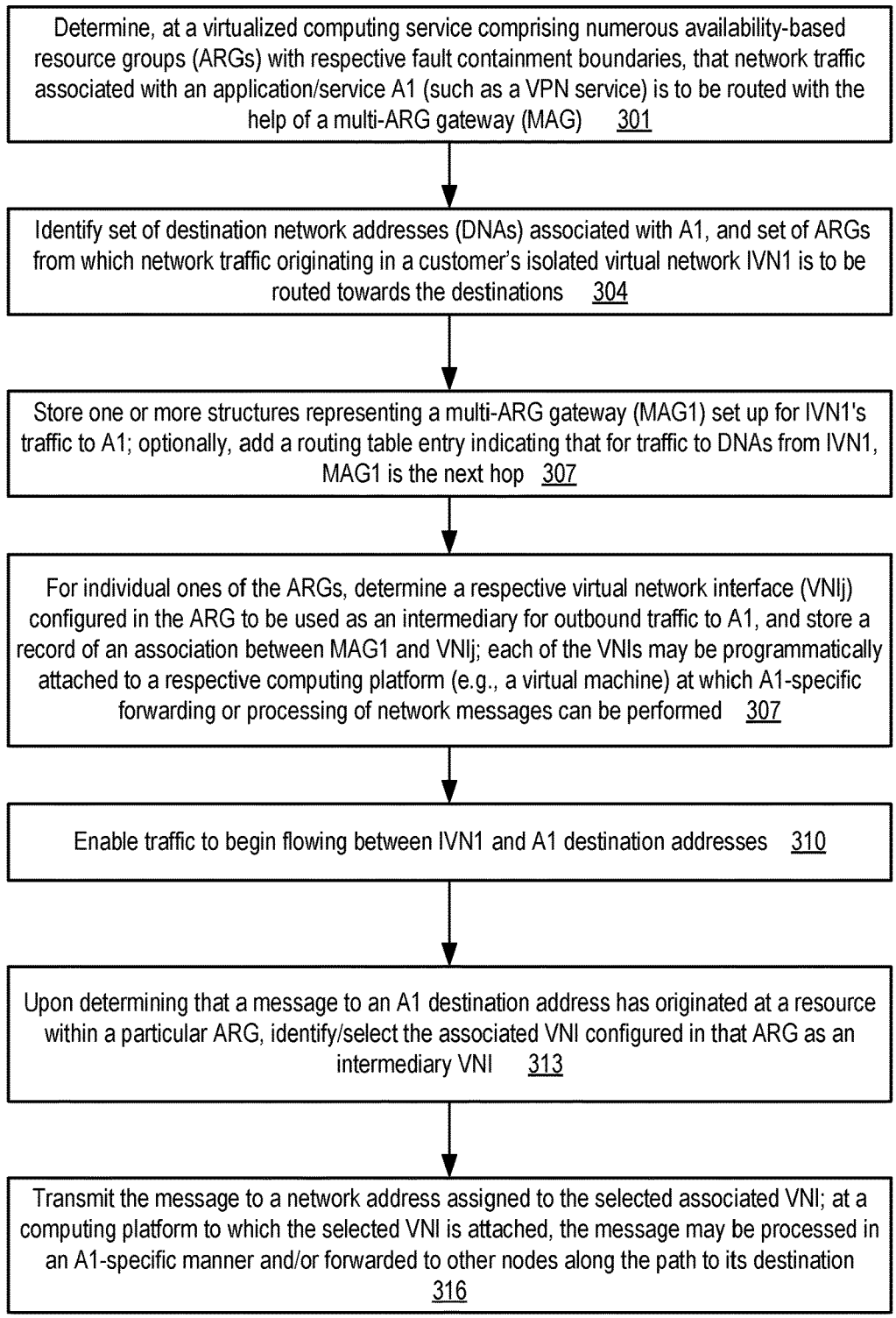
FIG. 3 is a flow diagram illustrating aspects of operations that may be performed to configure and utilize multi-resource-group gateways to enhance availability at a virtualized computing service, according to at least some embodiments.

FIG. 3 is a flow diagram illustrating aspects of operations that may be performed to configure and utilize multi-resource-group gateways to enhance availability at a virtualized computing service, according to at least some embodiments. As shown in element 301, a determination may be made at a virtualized computing service (VCS) comprising numerous availability-based resource groups (ARGs) with respective fault containment boundaries, that network traffic associated with an application/service A1 (such as a VPN service used to communicate with entities outside the provider network) is to be routed with the help of a multi-ARG gateway (MAG) in the depicted embodiment. Such a determination may be made, for example, based at least in part on obtaining or receiving a programmatic request from a client or customer of the VCS in various embodiments. Note that the client may be an entity or organization within the provider network at which the VCS is implemented in some cases—e.g., a programmatic request to set up an MAG may be received in various embodiments from the service (within the provider network) whose endpoints or service nodes are the destinations to which traffic is to be routed, or intermediaries along the pathway to the destinations. In various embodiments a programmatic request indicating that an MAG is to be used may alternatively be submitted by a customer on whose behalf one or more isolated virtual networks (the sources of the traffic to be routed with the help of the MAG) have been established at the VCS.

A set of destination network addresses associated with A1, and a set of one or more ARGs from which network messages originating in a customer's isolated virtual network IVN1 are to be routed using the MAG towards the set of destination network addresses may be determined (element 304) in various embodiments. The set of destinations and/or ARGs may be indicated as parameters of one or more programmatic requests in various embodiments. In at least one implementation the set of destination addresses may, for example, be specified programmatically using one or more CIDR (Classless Inter-Domain Routing) blocks.

One or more data structures representing a multi-ARG gateway MAG1 set up for IVN1's traffic to A1 may be stored in various embodiments (element 307), e.g., by a network manager or other administrative component of the VCS. Such a data structure may, for example, indicate a name or identifier of the gateway, the IVN and ARGs for which it is to be used, the client/customer on whose behalf it is being created, the set of destination addresses for which routing is to be performed using virtual network interfaces (VNIs) associated with the gateway, etc., in various embodiments. In some embodiments, a route table entry indicating that MAG1 is to be used as an intermediary for outbound messages directed to the set of destination addresses (DNAs) may be created and propagated to various devices of the VCS. In at least one embodiment, one or more public and/or private IP addresses may be assigned specifically to MAG1, making it directly addressable (e.g., without requiring a lookup in a route table) from various virtual machines and other components of the VCS or the provider network.

With respect to individual ones of the ARGs for which the gateway has been configured, a respective virtual network interface VNIj to be used as an intermediary for outbound traffic to A1 may be associated with MAG1 in some embodiments (element 307). A record of the association(s) may be stored by the network manager in at least some embodiments, e.g., in the data structure(s) representing MAG1 or in separate data structures. In one embodiment, the attributes stored for a virtual network interface may include an indication of the MAG (if any) with which the VNI is associated; VNI attributes are discussed in further detail below in the context of FIG. 4. Individual ones of the associated VNIs of MAG1 may be programmatically attached to a respective computing platform (such as a virtual machine implemented at the VCS) and assigned one or more network addresses in various embodiments. The computing platform to which a given VNI is attached may be configured (e.g., may comprise software, firmware and/or hardware elements) to perform application-specific processing and/or forwarding with respect to the network messages directed to the platform using MAG1 in at least some embodiments.

After a desired number of VNIs have been associated with MAG1, traffic flow may be enabled between various resources within IVN1 (e.g., virtual machines set up on behalf of a customer) and the A1-related destinations (element 310) in at least some embodiments. In some embodiments, various types of information pertaining to MAG1, such as the particular VNI to be used for each ARG, the default VNI, and so on, may be propagated or distributed to various network manager components after MAG1 has been configured (or whenever the configuration of MAG1 changes), e.g., including network management agents running locally at virtualization hosts within IVN1, routers and other intermediary networking devices of the VCS, and so on.

If/when a determination is made that a particular network message is directed to one of the destination network addresses for which MAG1 was established, and that the particular network message originated within an ARG for which MAG1 was established, in at least some embodiments the associated VNI configured in that ARG may be selected as an intermediary for the message (element 313) from among the VNIs associated with MAG1. Such a selection operation may, for example, be performed at a network manager component or agent running as part of the virtualization management stack at a virtualization host, or at an intermediary networking device in some embodiments. In at least one embodiment, instead of propagating the identities of all the VNIs associated with MAG1 to various network management components in different ARGs being used by IVN1, only the identity of the VNI which is to be used as an intermediary for messages originating in a given ARG may be propagated to the network management components within that given ARG. In an embodiment in which the latter approach is used, the selection of the VNI for a given message from among the associated VNIs may not necessarily occur in real time after the message has been generated. Instead, in such an embodiment, the VNI to be used for the given message may be identified because it is the only VNI (among the associated VNIs of MAG1) about which information is available at the device where the real-time decision to use MAG1 for a network message is being made.

After the particular associated VNI to be used for the message is identified, the message may be transmitted in various embodiments to a network address assigned to that VNI (element 316) in the depicted embodiment. At a computing platform to which the VNI is programmatically attached, the message may be processed in an A1-specific manner and/or forwarded to one or more other nodes along the path to its destination network address in various embodiments.

Virtual Network Interfaces

Figure 4:
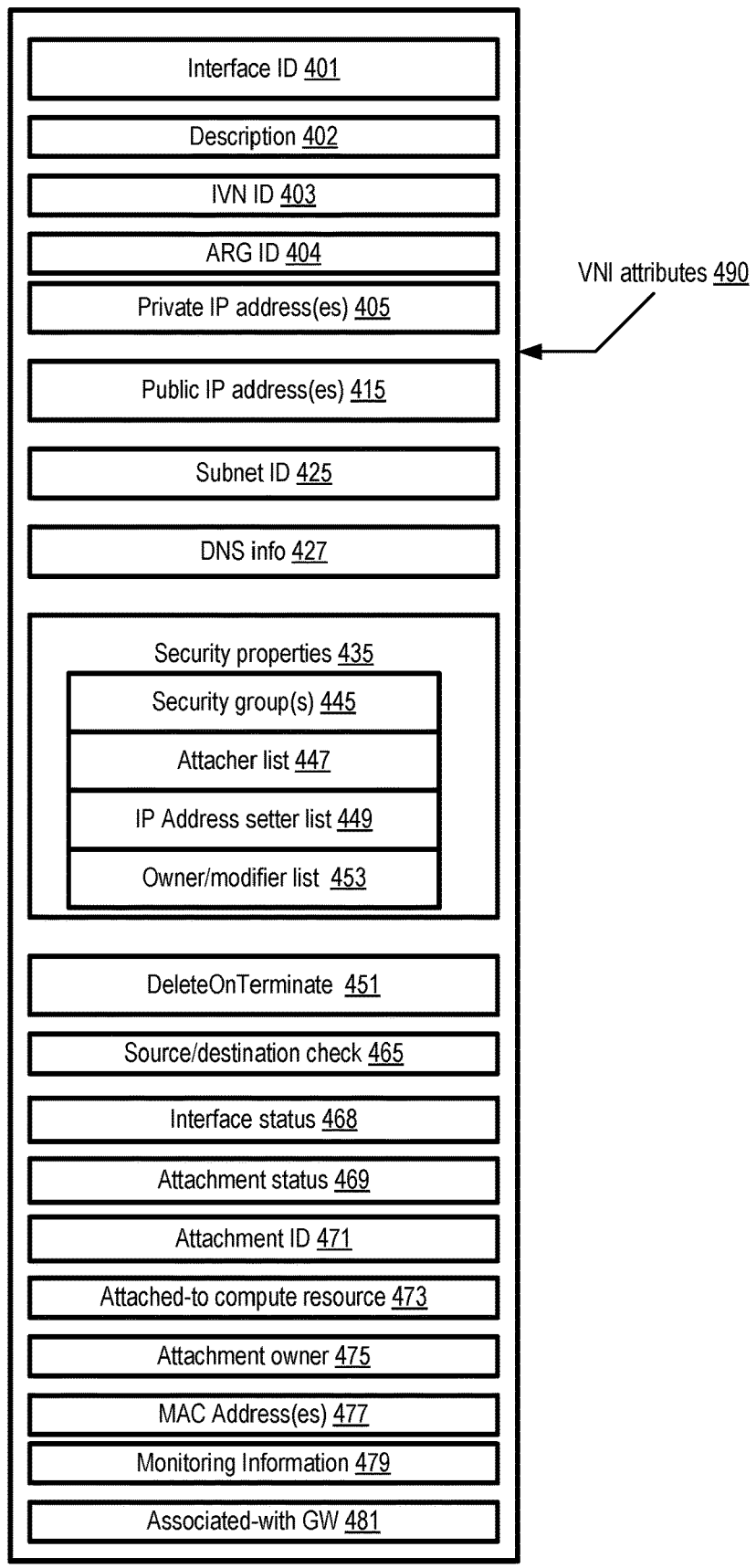
FIG. 4 illustrates example attributes of virtual network interfaces that may be associated with multi-resource-group gateways, according to at least some embodiments.

In at least some embodiments a virtual network interface (VNI) may represent a collection of networking-related attributes that can be dynamically associated with or disassociated from computing platforms such as virtual machines via "attach" and "detach" operations respectively. FIG. 4 illustrates example attributes of virtual network interfaces that may be associated with multi-resource-group gateways, according to at least some embodiments. (It is noted that VNIs may be used for numerous other purposes than multi-ARG gateways in various embodiments—e.g., in some embodiments, at least one VNI may be configured by default for each virtual machine set up at a VCS.) A generalized list of example attributes is shown in FIG. 4, not all of which may necessarily be used for VNIs that are associated with multi-ARG gateways in at least some embodiments. Only a subset of the attributes or properties shown in FIG. 4 may be implemented in some embodiments, and not all the implemented attribute fields may have to be populated (i.e., some of the attributes may be left blank or null). Respective records comprising fields/entries containing the attributes 490 of various VNIs may be stored in a persistent metadata store in some embodiments, e.g., a store that is accessible from various control-plane or administrative components of the provider network or the VCS, including for example the network manager.

When a new VNI is created, e.g., in response to a programmatic request from a client of a virtual computing service which supports VNIs, a new interface identifier 401 may be generated for it in the depicted embodiment. In some implementations, a description field 402 may be filled in by the client that requested the creation of the VNI, e.g., "Interface 554 for client group CG-X of file storage service". As discussed earlier, a VCS within which the VNI is to be used may comprise a plurality of availability-based resource groups (ARGs) and isolated virtual networks (IVNs) in some embodiments. The attributes 490 may contain an IVN identifier 403 (indicating an IVN within which the VNI is configured) and/or the ARG identifier 203 (indicating an ARG within which the VNI is configured) in such embodiments.

Any of several types of network addressing-related fields may be included within the set of attributes of a VNI in different embodiments. One or more private IP addresses 405 may be specified in some embodiments, for example. Such private IP addresses, also referred to herein as non-public addresses, may be used internally for routing within the provider network, and may not be directly accessible from outside the provider network (or within other IVNs) in various embodiments. In some embodiments, at least some non-public IP addresses associated with a VNI may not be IP addresses; that is, addressed formatted according to a proprietary protocol of the provider network may be used, or addresses formatted according to a different public-domain protocol may be used. In general, zero or more public IP addresses 415 may also be associated with VNIs in some embodiments; these IP addresses may be visible outside the provider network, e.g., to various routers of the public Internet or peer networks of the provider network. However, in at least some embodiments, public IP addresses may not be used for VNIs that are associated with multi-ARG gateways. One or more subnet identifiers 425 (e.g., expressed in Classless Inter-Domain Routing or CIDR format) may be included within attributes 490 in some embodiments, such as identifiers of subnets set up by a client within an IVN in which the VNI is to be used. In one embodiment an identification of a Domain Name Server (DNS) responsible for propagating address(es) associated with the VNI, or other DNS-related information 427, may be included in the attributes 490 as well.

In some embodiments the attributes 490 may include security-related properties 435. Some provider networks may allow users to specify rules, including for example firewall-related rules, for the types of incoming and/or outgoing traffic allowed at compute instances to which a VNI may be attached. Such rules may be termed "security groups" and identified via security group(s) fields 445. Various port and protocol restrictions may be enforced using such rules in some embodiments, and multiple rules may be associated with each VNI. For example, a client may use security groups to ensure that only HTTP and HTTPs outgoing or incoming traffic is allowed, to limit the set of TCP or UDP ports to which traffic is permitted, to filter incoming and outgoing traffic according to various policies, and so on. In some implementations an attacher list 447 may be specified, indicating which users or entities are allowed to request attachments of the VNI to computing platforms such as virtual machines of the VCS. In some cases a separate detacher list may be used to specify which entities can detach the VNI, while in other cases a single list such as attacher list 447 may be used to identify authorized attachers and detachers. The collection of users or entities that are allowed to set or modify IP addresses (e.g., public IP addresses 415 and/or private IP addresses 405) of the VNI may be provided in IP address setter list 449, and the set of users or entities that own (or can modify various other fields of) the VNI may be specified in owner/modifier field 453 in some embodiments. For example, an owner/modifier identified in field 453 may be permitted to change the attacher list 447 or the IP address setter list in some implementations, thus changing the set of entities permitted to attach or detach the VNI or modify its IP address(es). While the term "list" has been used for fields 447, 449, and 453, logical data structures other than lists (such as arrays, hash tables, sets and the like) may be used to represent the groups of entities given various security privileges, roles and/or capabilities in various embodiments.

In some embodiments, users of the virtual computing service of a provider network may be allowed to terminate virtual machines (VMs) programmatically. For example, a client may set up VMs, attach VNIs to the VMs, run a desired set of computations on the VMs, and then issue a request to terminate the instances when the desired computations are complete. In such embodiments, a "DeleteOnTerminate" setting 451 may be used to specify what happens to attached VNIs when a VM is terminated. If DeleteOnTerminate is set to "true" for a VNI attached to the VM being terminated, the VNI may be deleted (e.g., a persistent record comprising attributes 490 for the VNI may be removed from the repository in which it was being stored). If DeleteOnTerminate is set to "false", the VNI may be retained, so that for example it may be attached again to some other VM or other computing platforms. In one embodiment, when a VNI is attached to a VM, an attachment record separate from the VNI attributed 490 may be created to represent that relationship, and the DeleteOnTerminate property may be associated with the attachment record instead of or in addition to being associated with the VNI itself. In such an embodiment, the VNI's attributes 490 may include a reference or pointer to the attachment record or records for each of the attachments in which the VNI is currently involved, and different values of "DeleteOnTerminate" may be set for each attachment record.

In one embodiment, the attributes 490 may contain routing-related information such as an indication 465 of whether a source and/or destination check is to be performed for network packets transmitted to a computing platform to which the VNI is attached. If the source/destination check setting is set to "false" or "off", routing decisions may be made based on a packet's source and destination IP addresses, e.g., the packet may be forwarded from one subnet to another; and if the setting is "true" or "on", the computing platform may not perform routing in some embodiments. Thus the source/destination field 465 may be used in some embodiments to control whether a computing platform to which the VNI is attached performs routing or gateway functions on packets for which it is not the final destination, or whether it ignores such packets. Other types of routing-related information, such as route table entries, may also or instead be included in attributes 490 in other embodiments. Billing-related information may be included in attributes 490 in some implementations, identifying for example the entity or user to be billed for network traffic associated with the VNI.

The interface status field 468 may be used to indicate a current state of the VNI—e.g., whether the VNI is "available", "disabled", or "in-repair". Similarly, the attachment status field 469 may be used to indicate whether the VNI is currently attached, detached or in the process of being attached or detached in some embodiments. In one implementation, as described above, a record of an attachment may be created at the time the corresponding attachment operation is performed, and an identifier or identifiers of the current attachments of the VNI may be stored in attachment id field 471. Identifiers of the computing platforms to which the VNI is currently attached may be stored in attached-to instance field 473, and the user or entity that requested the attachment may be identified via attachment owner field 475 in some embodiments. In one embodiment, a list of identifiers of the physical network interface card (NIC) or NICs currently usable for traffic directed to/from the IP addresses of the VNI may be maintained, e.g., in the form of a MAC address(es) field 477. In some implementations, monitoring information 479, such as statistics about the amount of traffic flowing to or from the IP addresses of the VNI, may also be retained among attributes 490. In at least one embodiment, the identifier of a multi-ARG gateway (MAG) with which the VNI is currently associated (if any) may be stored among the attributes, e.g., in associated-with GW field 481. Other fields not shown in FIG. 4 may be included in various embodiments.

In one embodiment, some of the fields shown in FIG. 4 may be replaced by references or pointers to other objects. For example, security information for a VNI may be stored in a separate security object, and the attributes 490 may include a reference to the security object. Similarly, each attachment of a computing platform to a VNI may be represented by an attachment object, and the attributes 490 may include pointers to the appropriate attachment objects in some implementations.

Default VNIs for Multi-ARG Gateways

Figure 5:
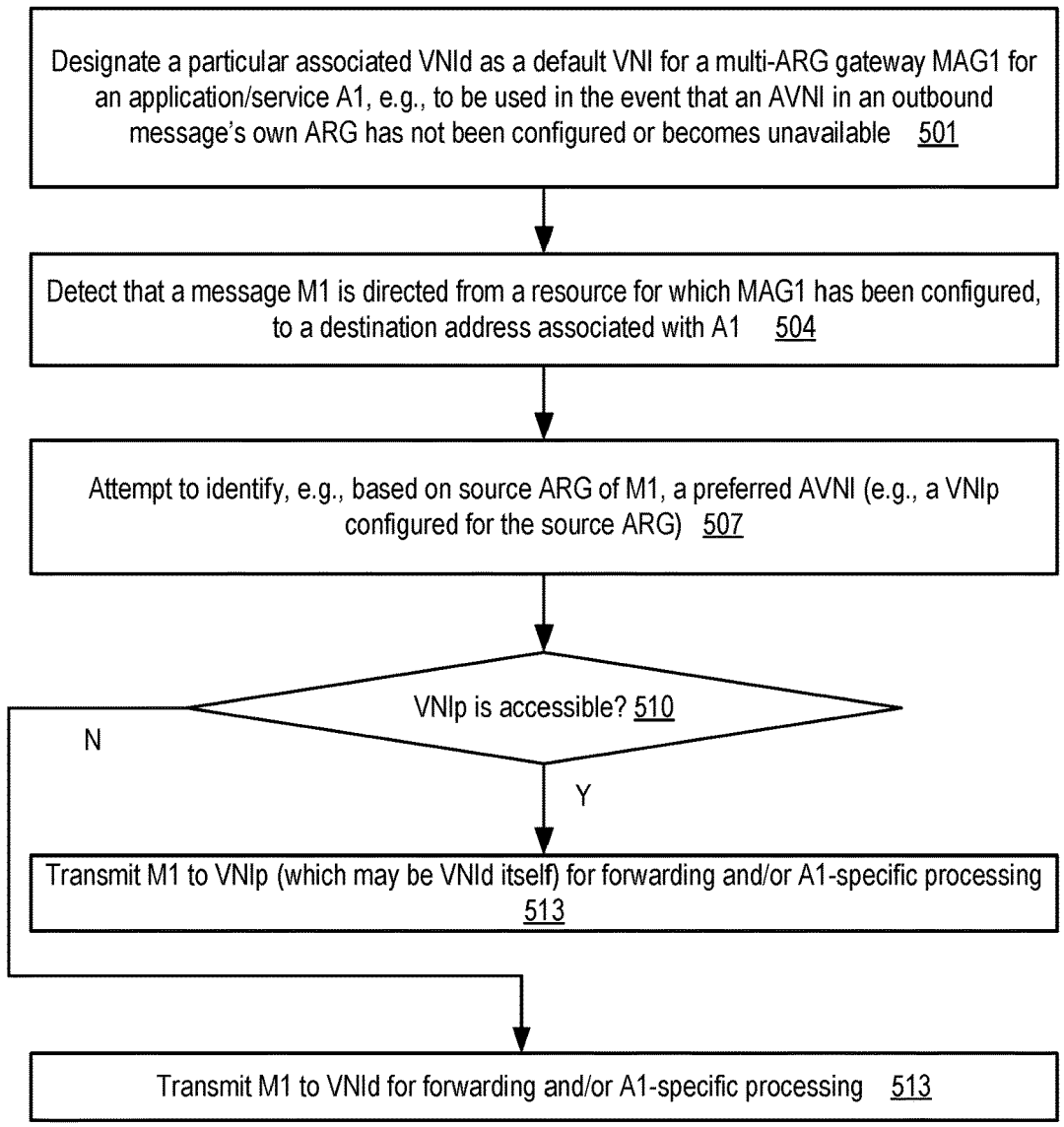
FIG. 5 is a flow diagram illustrating aspects of operations that may be performed to route network traffic using a multi-resource-group gateway which has a particular associated virtual network interface designated as a default virtual network interface, according to at least some embodiments.

As mentioned earlier, in at least some embodiments, a particular virtual network interface may be configured as a default for a multi-resource-group gateway, e.g., to be used as an intermediary for outgoing network messages if a preferred VNI is unavailable or has not been set up. FIG. 5 is a flow diagram illustrating aspects of operations that may be performed to route network traffic using a multi-resource-group gateway which has a particular associated virtual network interface designated as a default virtual network interface, according to at least some embodiments. As shown in element 501, among the associated VNIs of a multi-ARG-gateway MAG1 configured for an application or service A1, one (referred to as VNId in FIG. 5) may be designated as the default.

When a message M1 is directed from a resource for which MAG1 has been set up (e.g., a virtual machine in an isolated virtual network of a customer on whose behalf MAG1 is configured), to a destination network address of A1 (element 504), an attempt may be made (e.g., at a component of a network manager responsible for routing outbound messages to the destination addresses) to identify a preferred AVNI for the message M1 (element 507). In at least some embodiments, as discussed earlier, respective VNIs in one or more different ARGs may be associated with a given MAG, e.g., in response to programmatic requests, and an AVNI VNIp that is established in the same ARG as the source of a given outbound message may be considered a preferred AVNI for that message.

If a preferred AVNI, VNIp, is accessible, as detected in operations corresponding to element 510, the message M1 may be transmitted to a network address assigned to VNIp (element 513) for forwarding and/or application-specific processing in the depicted embodiment. Note that the preferred VNI may in some cases be the default VNI itself. If a preferred AVNI cannot be accessed, as also detected in operations corresponding to element 510, the message M1 may be transmitted to an address assigned to VNId for forwarding and/or application-specific processing (element 513) in at least some embodiments. The preferred AVNI may not be accessible for any of several reasons in different embodiments—e.g., because no VNI in the source ARG has been associated with MAG1, because the VNI in the source ARG is temporarily unavailable, etc.

It is noted that in various embodiments, some of the operations shown in FIG. 3 and/or FIG. 5 may be implemented in a different order than that shown in the figure, or may be performed in parallel rather than sequentially. Additionally, some of the operations shown in FIG. 3 and/or FIG. 12 may not be required in one or more implementations.

Traffic Path Example

Figure 6:
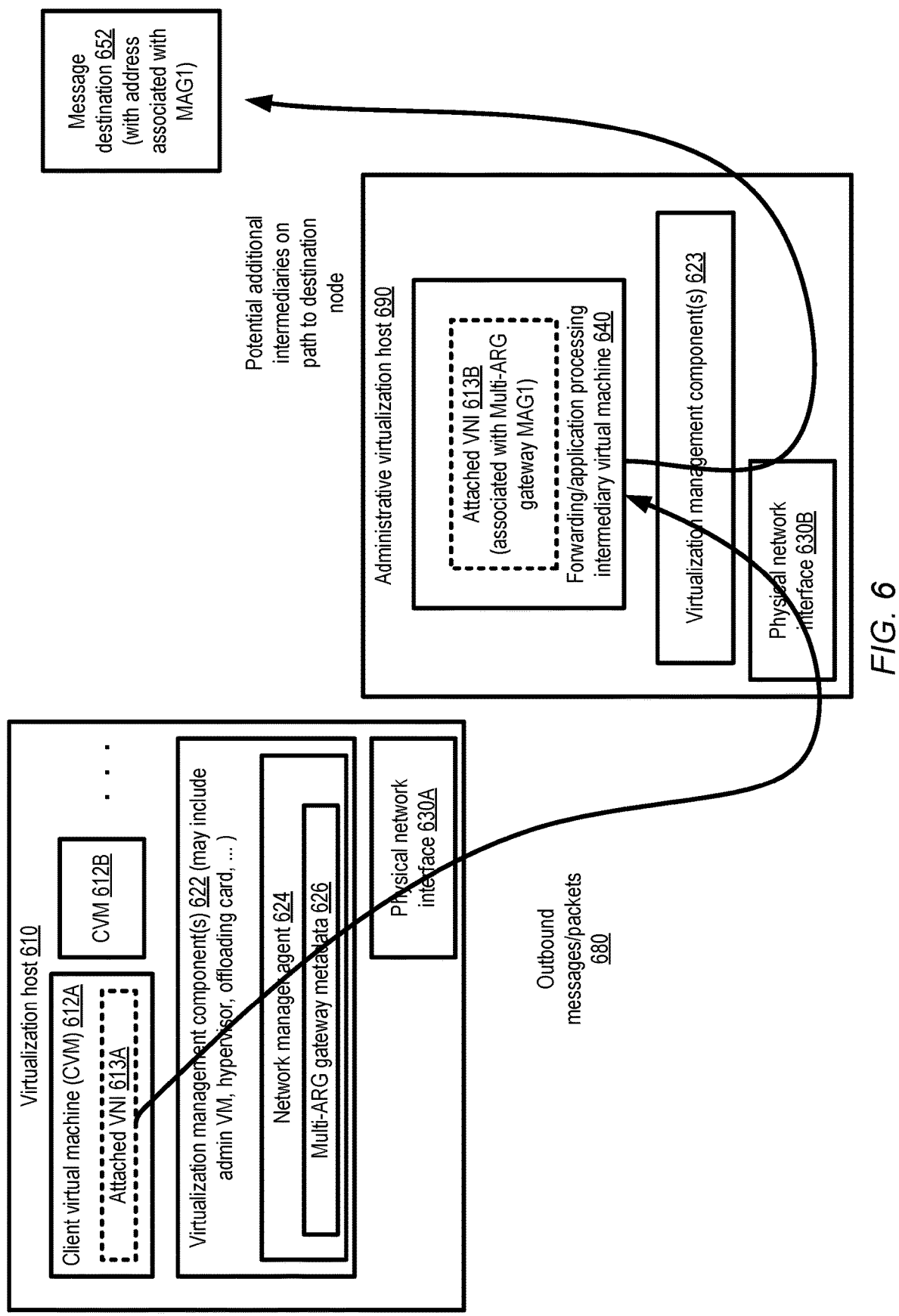
FIG. 6 illustrates aspects of network traffic flow from a virtual machine instantiated at a computing service at which multi-resource-group gateways are configured, to an application destination node, according to at least some embodiments.

As mentioned earlier, in at least some embodiments the network messages or packets for which routing is performed with the help of a multi-resource-group gateway may originate at virtual machines instantiated on behalf of clients of a virtualized computing service. FIG. 6 illustrates aspects of network traffic flow from a virtual machine instantiated at a computing service at which multi-resource-group gateways are configured, to an application destination node, according to at least some embodiments. In the depicted embodiment, a plurality of client virtual machines (CVMs) 612, such as 612A and 612B, may be launched at a particular virtualization host 610 of a computing service, and administered with the help of virtualization management component(s) 622. Individual ones of the CVMs may be established on behalf of respective clients of the computing service in a multi-tenant mode of operation in some embodiments. The virtualization management components may comprise hardware and/or software elements in various embodiments, including for example an administrative virtual machine or operating system instance, a hypervisor, a virtualization management offloading component implemented at a peripheral card, and so on.

In some embodiments, a respective virtual network interface (VNI) may be created and attached programmatically to a CVM to enable connectivity of the CVM to various network destinations—for example, VNI 613B has been attached to CVM 612A. The virtualization management components 622 may comprise a network manager agent 624 in the depicted embodiment, at which metadata 626 pertaining to one or more multi-ARG gateways (e.g., the set of associated VNIs of the gateways, the destination addresses towards which network messages are to be directed using the associated VNIs, etc.) may be accessible. Such metadata 626 may, for example, have been stored at other administrative components of the computing service in response to programmatic requests, and propagated to the agents 624 at various virtualization hosts in the depicted embodiment. In addition to the virtualization hosts such as 610, the metadata 626 pertaining to multi-ARG gateways may also be propagated to a number of other types of devices associated with the virtualized computing service in various embodiments, including for example edge intermediary devices involved in managing traffic flowing in and out of the virtualized computing service or the provider network as a whole, routers, switches and the like. The metadata 626 may, for example, indicate that VNI 613B, attached to another virtual machine 640 instantiated at an administrative virtualization host 690, is associated with a multi-ARG-gateway (MAG1) to be used for some network messages directed to an application destination node 652 in the depicted embodiment.

Based at least in part in the metadata 626, the network manager agent 624 may direct an outbound message (which has a destination address among the set of destination addresses of MAG1), to a network address assigned to VNI 613B in the depicted embodiment. In at least some embodiments, the network manager agent 624 may be implemented on a hardware device, e.g., comprising circuitry on a card accessible from the virtualization host's CPUs via a peripheral interconnect. Such a hardware device may represent one example of an offloading component referred to above, intended to reduce the amount of virtualization management-related processing that has to be performed on the CPUs, and thereby making more of the CPU's processing cycles available for use by client virtual machines. The message may be encapsulated in accordance with a protocol used for internal traffic within the computing service and transmitted via physical network interface 630A along a path to host 690 configured with physical network interface 630B, where the message may be processed at intermediary virtual machine 640 before being sent on to its ultimate destination 652. Additional outbound messages/packets 680 directed to destination 652 may also be transmitted along similar paths to the virtual machine 640, and from virtual machine 690 to the destination in the depicted embodiment. Note that in some embodiments, the administrative virtualization host 690 may also include one or more virtualization management components 623 similar to components 622 (including, for example, offloading components of the kind discussed above). In at least one such embodiment, if the host 690 is being used exclusively for network processing within the computing service, and therefore does not include client VMs, the virtualization management tasks required at the host 690 may be less complex than if client VMs were also instantiated; as a result, a different virtualization management stack 623 may be used than is used at hosts (such as host 610) where customer applications run on client VMs.

Example Programmatic Interactions

Figure 7:
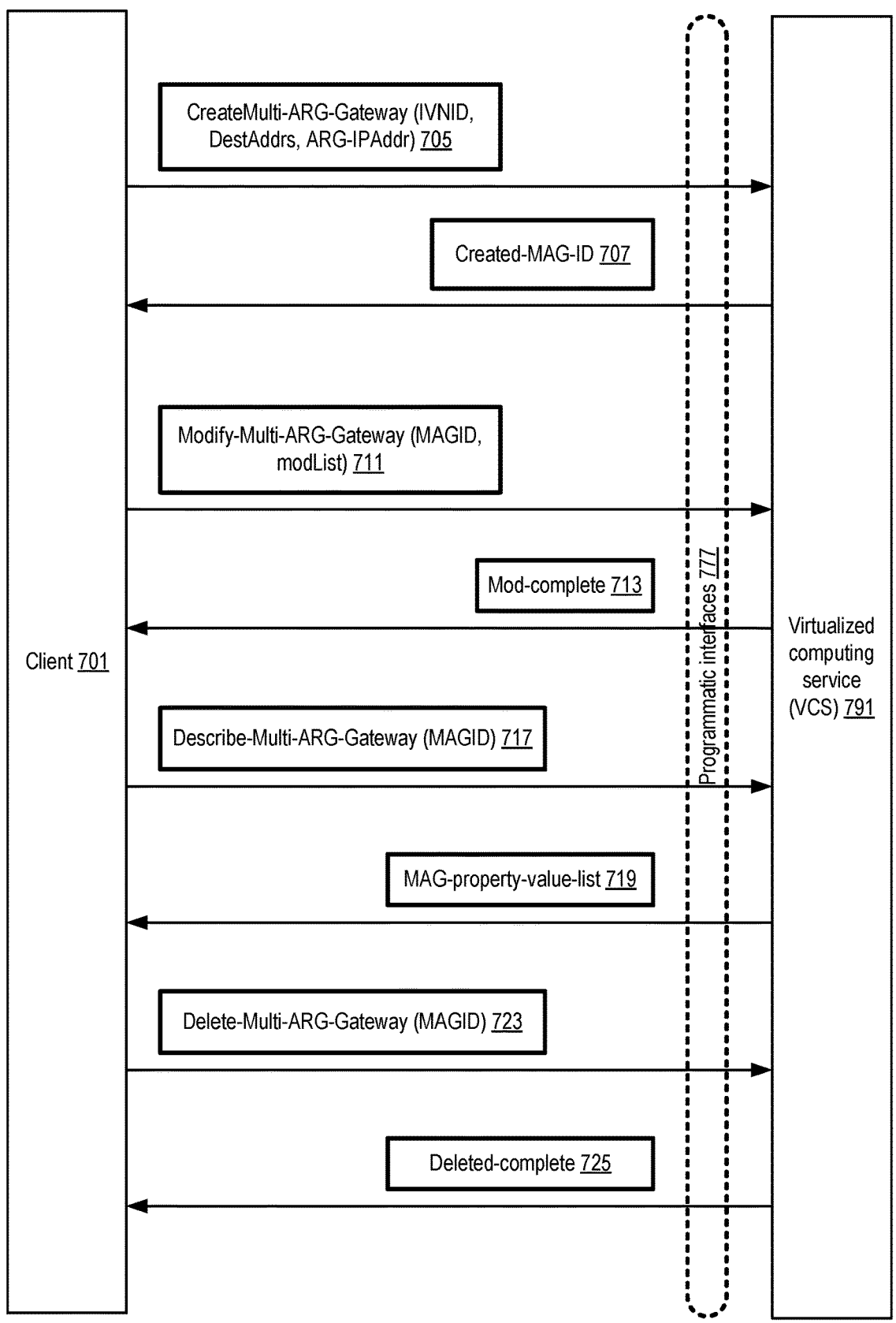
FIG. 7 and FIG. 8 illustrate respective sets of examples of gateway configuration-related programmatic interactions between a client and a virtualized computing service, according to at least some embodiments.
Figure 8:
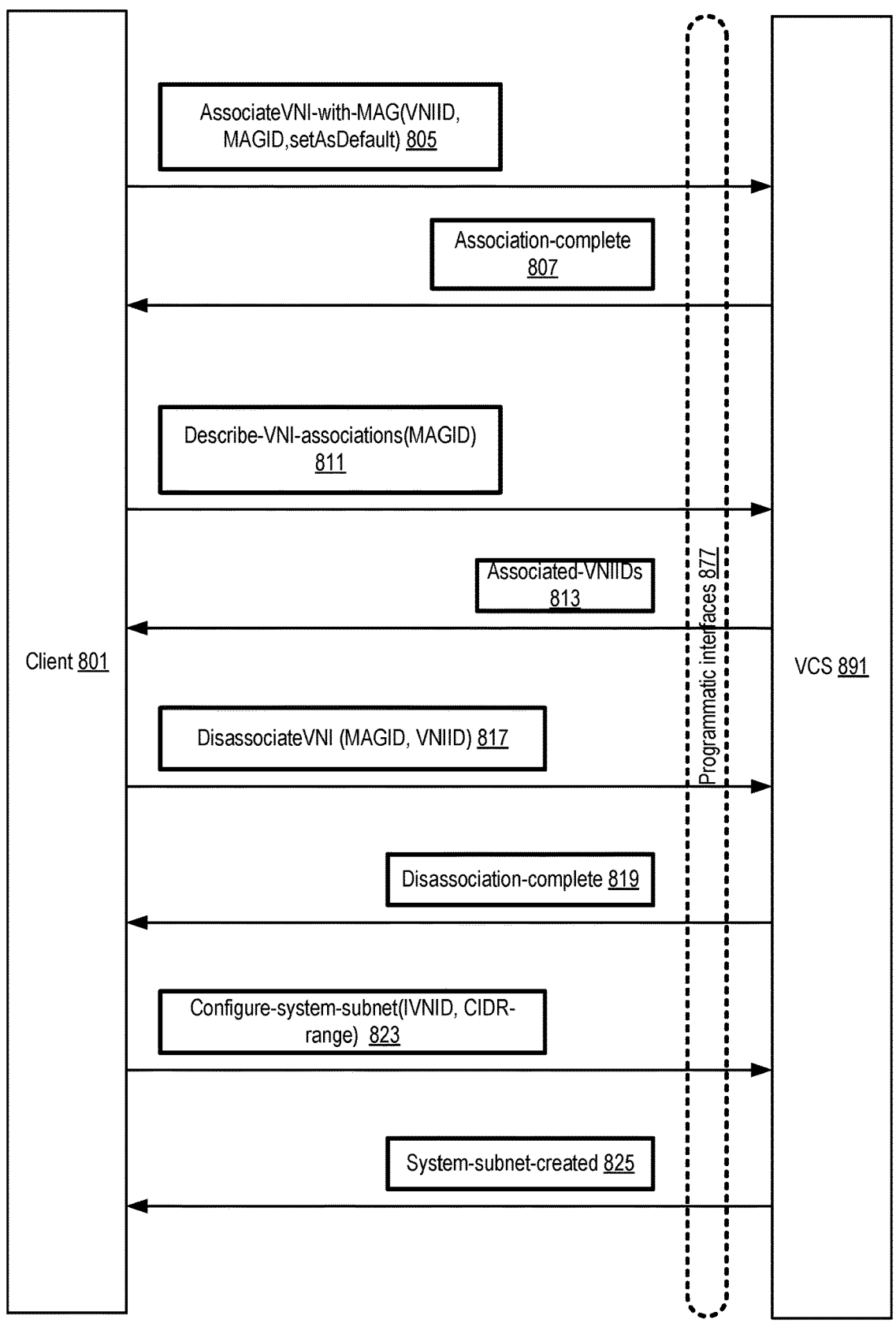

FIG. 7 and FIG. 8 illustrate respective sets of examples of gateway configuration-related programmatic interactions between a client and a virtualized computing service, according to at least some embodiments. In the depicted embodiment, a virtualized computing service 791 may implement one or more programmatic interfaces 777 usable by clients 701 to submit requests and receive corresponding responses. The programmatic interfaces 777 may comprise, for example, a web-based console, a set of application programming interfaces (APIs), command-line tools, and/or a graphical user interface in various embodiments. Note that the client 701 may be an administrative component of a service implemented at the provider network in which the VCS is implemented in some embodiments, while in other embodiments the client may be an external customer of the VCS.

Using the interfaces 177, a client 701 may submit a request to create or establish a multi-ARG gateway 705 in the depicted embodiment. Parameters of the CreateMulti-ARG-Gateway request 705 may include, among others, an identifier (IVNID) of an isolated virtual network for whose outbound traffic the gateway is to be used, and/or a set of destination addresses DestAddrs which may be used to distinguish messages/packets which are to be routed using the gateway from other messages/packets. In at least one embodiment, clients 701 may also specify other attributes of the desired gateway, such as a private (or public) IP address ARG-IPAddr to be assigned to the gateway itself. Such an IP address may be stored along with other metadata pertaining to the gateway, and may be propagated to various virtualized and/or physical devices used at the isolated virtual network in some embodiments. In some embodiments in which such IP addresses may be used as intermediary destinations for outbound packets, an indication of how the eventual/final destination address of a given outbound message should be selected may also be provided programmatically to the VCS—e.g., whether any of the destination addresses in DestAddrs can be selected at random, or whether a mapping function should be used to determine the final destination. In one embodiment, such a mapping function may also be included as a parameter in the request to create the gateway. In one embodiment, ARG-IPAddr may be assigned to an additional virtual network interface set aside for the gateway; such an additional virtual network interface may be considered a logical proxy for the per-ARG virtual network interfaces associated with the gateway. Consider a scenario in which such a proxy VNI PVNI is configured with address ARG-IPAddr, while VNIs AVNI1 (with IP address AVNI-addr1 in ARG-a) and AVNI2 (with IP address AVNI-addr2 in ARG-b) are associated with the gateway. In such an example, scenario, a virtual machine to which PVN1 is attached may forward an outbound packet (which was directed to ARG-IPAddr) to a virtual machine to which AVNI1 or AVNI2 are attached, depending on the source ARG of the message, and the outbound packet may then be processed and/or forwarded along a path to its ultimate destination. Note that in some embodiments a route table entry may be created even if one or more IP addresses are assigned specifically to the gateway. In response to the request 705, the VCS may generate a set of data structures representing the multi-ARG gateway, store the data structure in an administrative repository, and provide an identifier created-MAG-ID 707 in a response back to the client 701 in the depicted embodiment.

After the MAG has been created, the client 701 may submit a request 711 to modify one or more attributes/properties of the MAG in various embodiments via the interfaces 777, such as a request to modify the set of destination addresses, the IP address(es) assigned to the MAG itself (if any), or a description field of the MAG. Parameters to such a modify request 711 may include, for example, the identifier MAGID of the gateway and a list (modList) of requested modifications. If the requested modifications are permitted, they may be implemented and a modification-complete response 713 may be returned to the requesting client 701.

A client 701 may submit a programmatic request to obtain properties of an MAG (e.g., via a describe request 717 indicating an identifier of the MAG whose properties are to be provided) and/or a request to delete a multi-ARG gateway (e.g., via e request 723, identifying the multi-ARG gateway targeted for deletion) in some embodiments. The VCS may respond to a describe request 717 with a list 719 of property values which the client is authorized to view, and to a delete request 723 with a deletion completion response 725. It is noted that in at least some embodiments, some of the requested operations (e.g., deletion or creation of multi-ARG gateways may take some time to complete, and may be performed asynchronously with respect to the receipt of the requests. In at least one embodiment in which virtual network interfaces (VNIs) may be associated with a multi-ARG gateway, the VCS may not delete a gateway until any associated VNIs have been disassociated from the gateway. In other embodiments, if a request to delete a gateway is received and the targeted gateway has one or more associated VNIs, the VNIs may be disassociated (and/or deleted) as part of the processing of the deletion request.

As shown in FIG. 8, clients 801 may also submit several other types of programmatic requests to a VCS 891 in some embodiments. A request 805 to associate a specified virtual network interface with a multi-ARG gateway may, for example, result in the modification of the stored metadata pertaining to the gateway. Such an associateVNI request 805 may include as parameters the identifier (VNIID) of the VNI to be associated, the identifier (MAGID) of the gateway to which the VNI is to be associated, and/or an indication (setAsDefault) as to whether the specified VNI is to be designated as the default VNI for the gateway in some embodiments. The VCS 891 may respond with an association-complete message after the appropriate metadata has been modified to indicate the association in the depicted embodiment.

A describe-VNI-associations request 811 to list the associated VNIs of a gateway identified by a MAGID request parameter may be submitted via programmatic interfaces 877 in some embodiments, and the VCS 891 may return the identifiers 813 of the associated VNIs in response. If a client wishes to disassociate a VNI that is currently associated, a disassociateVNI request 817 specifying the gateway and the targeted VNI may be submitted in the depicted embodiment. In response, the metadata indicating the association may be deleted at the VCS (and if the disassociated VNI was designated as the default, an attempt to identify a new default VNI may be initiated), with a response 819 indicating the disassociation has been completed being provided to the client 801.

In at least one embodiment in which a multi-ARG gateway is configured for outbound traffic from a particular isolated virtual network (IVN), a subnet of the network address range available at the IVN may be set aside for the VNIs to be associated with the gateway. A configure-system-subnet request 823 may be transmitted to the VCS, indicating the identifier IVNID of the isolated virtual network and/or a range of addresses (specified using a CIDR range parameter of the request 823) to be designated as a system subnet. A record indicating that the CIDR range has been set aside for VNIs to be associated with the gateway may be stored at the VCS control plane, and a response 825 indicating that the system subnet has been created may be transmitted to the client. The subnet may be referred to as a "system" subnet in some embodiments because addresses within that subnet may not be available for direct use or access by/from client virtual machines; instead, the addresses of the subnet may only be used for administrative purposes such as gateway-related operations.

Example Virtual Private Network Service Utilizing Multi-ARG Gateways

Figure 9:
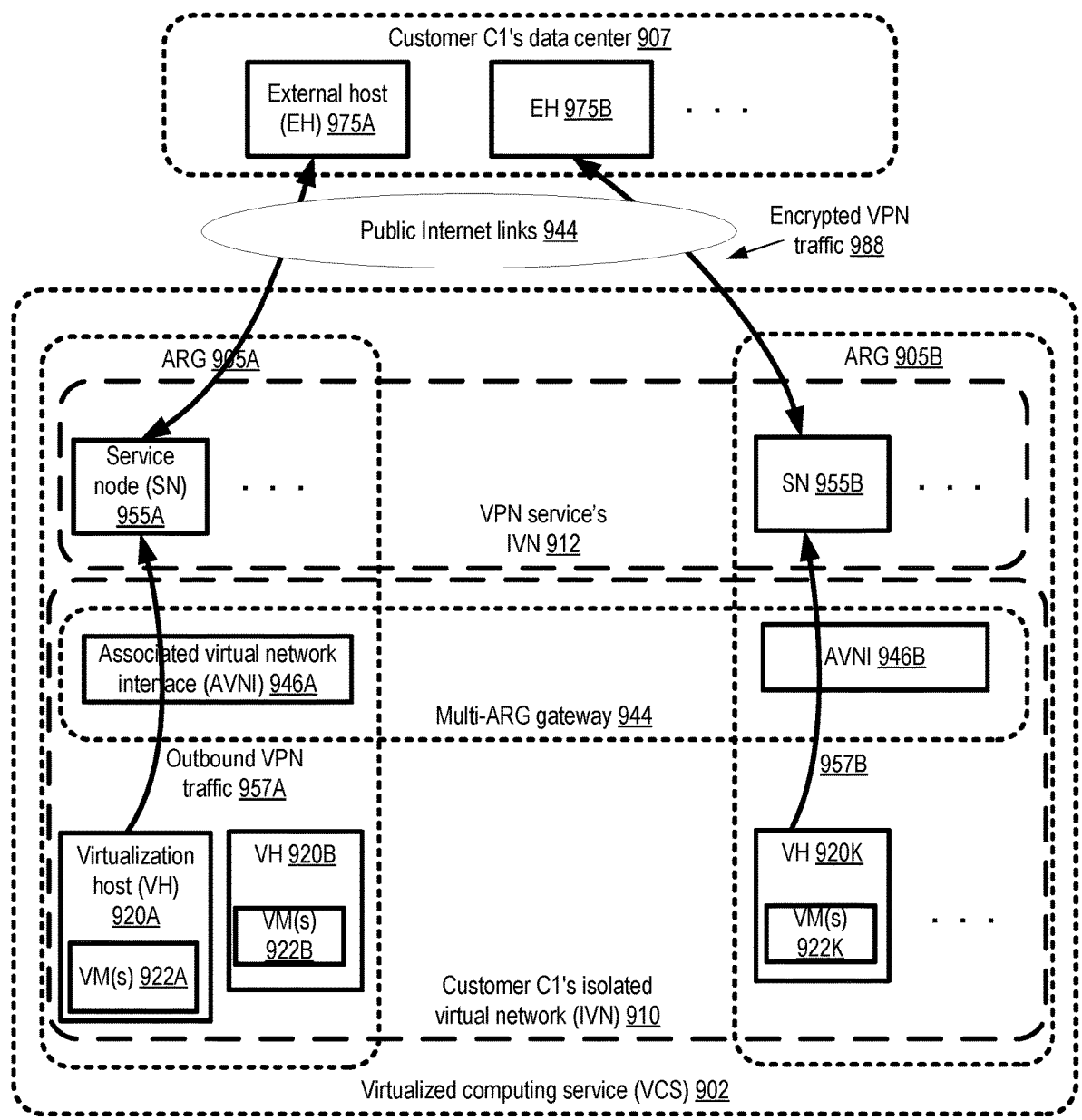
FIG. 9 illustrates an example use of a multi-resource-group gateway for a virtual private network service of a provider network, according to at least some embodiments.

FIG. 9 illustrates an example use of a multi-resource-group gateway for a virtual private network service of a provider network, according to at least some embodiments. In the depicted embodiment, a customer C1 of a VCS 902 may wish to enable secure network connectivity between virtual machines (VMs) instantiated within the VCS, and C1's data center 907 which is external to the VCS and can be reached from the VCS via links 944 of the public Internet. A virtual private network (VPN) service may be implemented at the provider network of the VCS to enable this type of secure connectivity in the depicted embodiment.

Customer C1's virtual machines (VMs) 922, such as 922A, 922B and 9022K, may be instantiated within an isolated virtual network (IVN) 910 in the depicted embodiment. The IVN 910 may include resources distributed among several different availability-based resource groups (ARGs), including for example, ARG 905A (within which C1's VMs 922A and 922B run at virtualization hosts 920A and 920B) and ARG 905B (within which C1's VM(s) 922K run at virtualization hosts 920K).

A multi-ARG gateway 944 may be configured in the depicted embodiment for routing traffic towards the data center from IVN 910. A second isolated virtual network 912 may be established on behalf of the VPN service, and may comprise some number of service nodes (SNs) such as 955A and 955B. The service nodes 955 may be configured such that at least one service node is present within each of the ARGs 905 in the depicted embodiment. Respective virtual network interfaces 946, such as 946A and 946B may be associated programmatically with the gateway 944. In at least some embodiments a given virtual network interface 946 may be attached programmatically to a respective administrative virtual machine (not shown in FIG. 9). Outbound network messages generated at VMs 922 within a given ARG, and directed to external hosts 975 (e.g., 975A or 975B), may be transmitted from a source virtualization host 920 to a service node 955 in the same ARG (at least by default), via an intermediary computing platform to which the AVNI 946 for that same ARG is programmatically attached. The destination network addresses for which the multi-ARG gateway is configured may comprise respective IP addresses of the external hosts 975 in the depicted embodiment.

At the service node 955, the appropriate processing operations (e.g., encryption) may be performed to secure the contents of the message before the message is transmitted to the destination data center 907 in the depicted embodiment. In various embodiments, respective VPN tunnels may be established between one or more of the service nodes 955 of VPN service in IVN 912 and the customer data center 907 to enable encrypted VPN traffic 988 to flow. Any of a variety of VPN-related protocols, such as IPSec (IP Security), Layer 2 Tunneling Protocol (L2TP), Transport Layer Security (TLS) or the like may be used for establishing VPN connections over which traffic 988 is transmitted in various embodiments. The configuration of the gateway 944 may help ensure that even in the unlikely scenario where a particular ARG becomes unreachable, VPN traffic between customer C1's virtual machines 922 and the external data center 907 continues to flow.

Use Cases

The techniques described above, of configuring and utilizing multi-resource-group gateways at a virtualized computing service, may be beneficial for a number of reasons in various scenarios. As more and more mission critical applications are migrated to provider network environments, the demand for secure, high performance and fault-resilient network connectivity between various groups of network endpoints also increases. Availability-based resource groups with respective fault containment boundaries may be established at some computing services to help with these demands. In many scenarios, the applications run on behalf of virtual computing service clients may be distributed across multiple resource groups, and may need to connect with endpoints associated with external computing platforms (as in the VPN example discussed above) or at services other than the virtual computing service itself. By configuring gateways that can be easily associated and disassociated with multiple virtual network interfaces attached to application-specific network processing nodes, with respective ones of the interfaces configured in different availability-based resource groups, the probability of a loss of connectivity between provider network-based message senders and recipients may be substantially reduced. Furthermore, as a result of configuring the gateways and associated virtual network interfaces, the outbound traffic directed from a customer's virtual machines may be distributed across multiple pathways to help overall performance.

Illustrative Computer System

Figure 10:
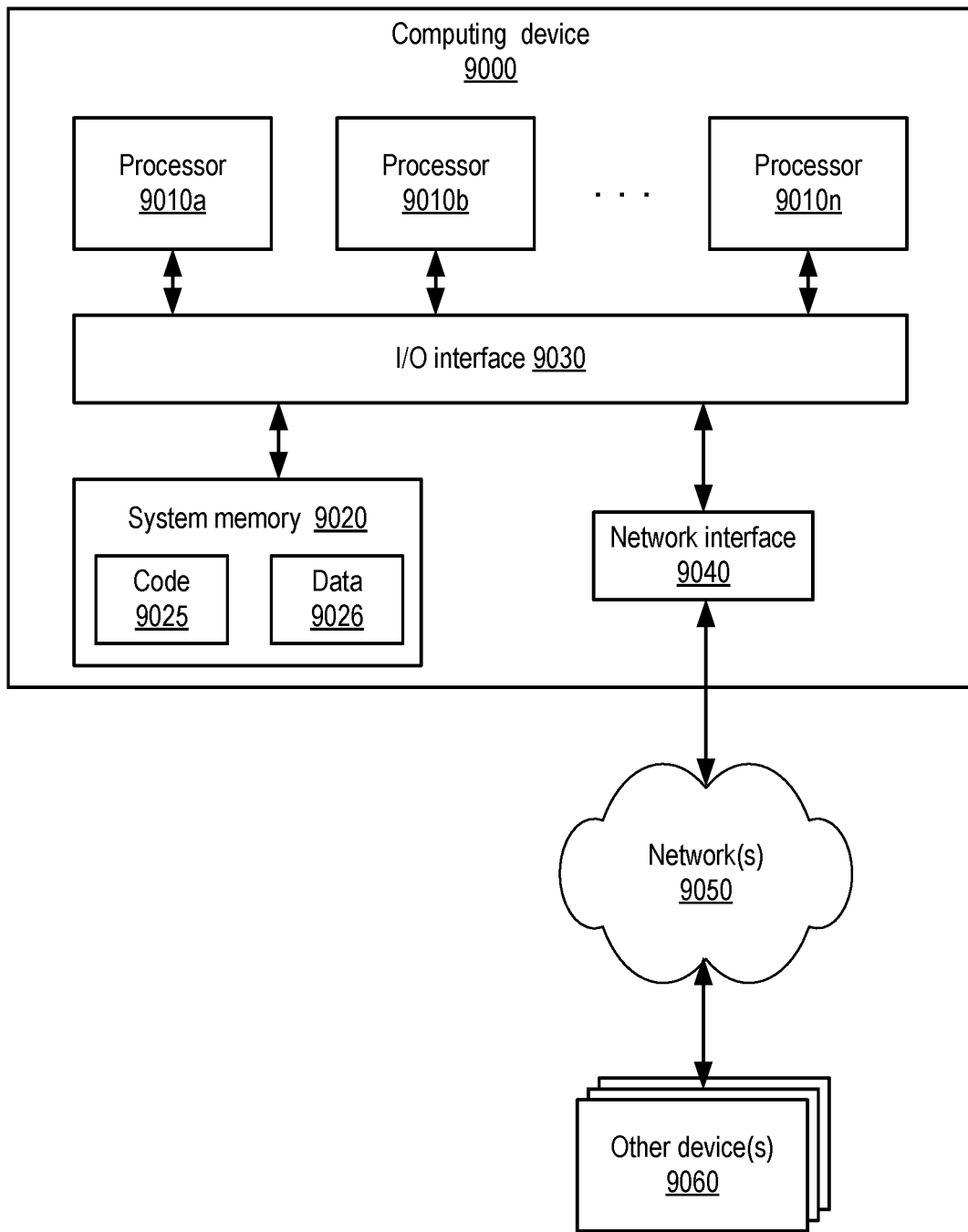
FIG. 10 is a block diagram illustrating an example computing device that may be used in at least some embodiments.

In at least some embodiments, a server that implements a portion or all of one or more of the technologies described herein, including the various network management components of a virtualized computing service, virtual machines and virtualization hosts, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of resources of a virtualized computing service organized into a plurality of availability-based resource groups, wherein individual availability-based resource groups, including a particular availability-based resource group, have respective fault containment boundaries;
a network manager implemented at one or more computing devices of the virtualized computing service;
wherein the network manager includes instructions that when executed on a processor cause the one or more computing devices to:
  determine a set of destination network addresses of a first application, including a first destination network address, for which resource-group based message processing is to be performed using a first multi-resource-group gateway;
  store an indication of respective associations of a plurality of virtual network interfaces with the first multi-resource-group gateway, wherein individual ones of the plurality of virtual network interfaces are configured within respective availability-based resource groups, including a first virtual network interface configured within the particular availability-based resource group;
  in response to determining that a first message related to the first application is directed to the first destination network address of the set of destination network addresses of the first application, from a resource within the particular availability-based resource group:
    identify the first virtual network interface of the plurality of virtual network interfaces to be used for the first message, wherein a selection of the first virtual network interface from the plurality of virtual network interfaces is based at least in part on the first virtual network interface being configured within the particular availability-based resource group that comprises the resource from which the first message originated, instead of being configured within another availability-based resource group of the plurality of availability-based resource groups that does not comprise the resource from which the first message originated; and cause the first message to be transmitted to a first network address of the first virtual network interface.

2. The system as recited in claim 1, wherein at least one network address of the set of destination network addresses is assigned to a device within a data center of a client of the virtualized computing service.

3. The system as recited in claim 1, wherein the instructions when executed cause the one or more computing devices to:

store a routing table entry indicating the association of the set of destination network addresses with the first multi-resource-group gateway.

4. The system as recited in claim 1, wherein the instructions when executed cause the one or more computing devices to:

store an indication that a particular virtual network interface of the plurality of virtual network interfaces is designated as a default interface of the first multi-resource-group gateway; and in response to a determination that another virtual network interface of the plurality of virtual network interfaces is inaccessible, cause a second message to be transmitted to a network address of the particular virtual network interface.

5. The system as recited in claim 1, wherein the instructions when executed cause the one or more computing devices to:

store, in response to determining that a gateway creation request has been transmitted via a programmatic interface, one or more data structures representing the first multi-resource-group gateway.

6. A method, comprising:

performing, by one or more computing devices of a network manager of a computing service:

determining a set of destination network addresses, including a first destination network address, for which resource-group based message processing is to be performed using a first multi-resource-group gateway;

determining that network messages originating at resources within a plurality of availability-based resource groups of the computing service, including a particular availability-based resource group, are to be routed at least in part using the first multi-resource-group gateway, wherein individual availability-based resource groups of the plurality of availability-based resource groups, including the particular availability-based resource group, have respective fault containment boundaries;

storing an indication of respective associations of a plurality of network interfaces of the computing service with the first multi-resource-group gateway, wherein individual ones of the plurality of network interfaces are configured within respective availability-based resource groups of the computing service, including a first network interface configured within the particular availability-based resource group; and in response to detecting that a first message is directed to the first destination network address of the set of destination network addresses, from a resource within the particular availability-based resource group:

determining that the first network interface, selected from the plurality of network interfaces based at least in part on the first network interface being configured within the particular availability-based resource group that comprises the resource at which the first message originated, instead of being configured within another availability-based resource group of the plurality of availability-based resource groups that does not comprise the resource at which the first message originated, is to be used for the first message; and causing the first message to be transmitted to a first network address of the first network interface that is configured within the particular availability-based resource group that comprises the resource at which the first message originated.

7. The method as recited in claim 6, further comprising performing, by one or more computing devices:

storing the set of destination network addresses associated with the first multi-resource-group gateway, wherein determining that the first network interface is to be used is responsive to determining that the first destination network address of the first message is a member of the set.

8. The method as recited in claim 7, wherein at least one network address of the set of destination network addresses is assigned to a device within a data center of a client of the computing service, wherein contents of the first message are transmitted along at least a portion of a pathway to the data center via a virtual private network (VPN) connection.

9. The method as recited in claim 7, wherein the resource within the particular availability-based resource group is part of a first isolated virtual network established on behalf of a first client of the computing service, wherein at least one network address of the set of destination network addresses is assigned to a resource within a second isolated virtual network of the computing service.

10. The method as recited in claim 7, wherein the resource within the particular availability-based resource group is assigned a network address which is not accessible from the public Internet, and wherein at least one network address of the set of destination network addresses is accessible from the public Internet.

11. The method as recited in claim 7, wherein the computing service is implemented at a provider network, and wherein at least one network address of the set of destination network addresses is assigned to a device used to implement functionality of another service implemented at the provider network.

12. The method as recited in claim 7, further comprising performing, by the one or more computing devices:

storing a routing table entry indicating the association of the set of destination network addresses with the first multi-resource-group gateway.

13. The method as recited in claim 6, further comprising performing, by the one or more computing devices:

storing an indication that a particular network interface of the plurality of network interfaces is designated as a default interface of the first multi-resource-group gateway; and in response to determining that another network interface of the plurality of network interfaces is unavailable, causing a second message to be transmitted to a network address of the particular network interface.

14. The method as recited in claim 6, further comprising performing, by the one or more computing devices:
storing, in response to obtaining a request via a programmatic interface, an indication of a particular network address assigned to the first multi-resource-group gateway; and
obtaining, at a platform to which the first network interface associated with the first multi-resource group is programmatically attached, a second network message directed to the particular network address.

15. The method as recited in claim 6, further comprising performing, by the one or more computing devices:
determining that a request to associate the first network interface with the first multi-resource-group gateway has been obtained via a programmatic interface, wherein an indication of an association of the particular networking interface with the first multi-resource-group gateway is stored in response to the request.

16. A non-transitory computer-accessible storage medium storing program instructions that when executed on one or more processors of a network manager of a computing service cause the one or more processors to:
determine a set of destination network addresses, including a first destination network address, for which resource-group based message processing is to be performed using a first gateway;
determine that network messages originating at resources within a plurality of availability-based resource groups of the computing service, including a particular availability-based resource group, are to be routed at least in part using the first gateway, wherein individual availability-based resource groups of the plurality of availability-based resource groups, including the particular availability-based resource group, have respective fault containment boundaries;
obtain an indication of respective associations of one or more network interfaces of the computing service with the first gateway, wherein individual ones of the network interfaces are configured within respective availability-based resource groups of the plurality of availability-based resource groups of the computing service, including a first network interface configured within the particular availability-based resource group; and
in response to detecting that a first message is directed to the first destination network address of the set of destination network addresses, from a resource within the particular availability-based resource group of the computing service:
select the first network interface, from the one or more network interfaces, based at least in part on the first network interface being configured within the particular availability-based resource group that comprises the resource at which the first message originated, instead of being configured within another availability-based resource group of the plurality of availability-based resource groups that does not comprise the resource at which the first message originated; and
cause the first message to be transmitted to a first network address of the first network interface that is configured within the particular availability-based resource group that comprises the resource at which the first message originated.

17. The non-transitory computer-accessible storage medium as recited in claim 16, wherein the instructions when executed on the one or more processors cause the one or more processors to:
store the set of destination network addresses associated with the first gateway, wherein selection of the first network interface is responsive to a determination that the first destination network address of the first message is a member of the set.

18. The non-transitory computer-accessible storage medium as recited in claim 17, wherein at least one network address of the set of destination network addresses is assigned to a device within a data center of a client of the computing service, wherein contents of the first message are transmitted along at least a portion of a pathway to the data center using a virtual private network (VPN) protocol.

19. The non-transitory computer-accessible storage medium as recited in claim 17, wherein the instructions when executed on the one or more processors cause the one or more processors to:
generate a routing table entry indicating the association of the set of destination network addresses with the first multi-resource-group gateway.

20. The non-transitory computer-accessible storage medium as recited in claim 17, wherein the instructions when executed on the one or more processors cause the one or more processors to:
store, in response to obtaining a gateway establishment request of a client of the computing service via a programmatic interface, one or more data structures representing the first gateway.

* * * * *